(12) United States Patent
Dyer

(10) Patent No.: US 8,100,009 B2
(45) Date of Patent: *Jan. 24, 2012

(54) METHOD AND APPARATUS FOR BALANCING

(75) Inventor: Stephen W. Dyer, Ann Arbor, MI (US)

(73) Assignee: Lord Corporation, Cary, NC (US)

( * ) Notice: Subject to any disclaimer, the term of this patent is extended or adjusted under 35 U.S.C. 154(b) by 121 days.

This patent is subject to a terminal disclaimer.

(21) Appl. No.: 12/288,939

(22) Filed: Oct. 24, 2008

(65) Prior Publication Data

US 2009/0281669 A1    Nov. 12, 2009

Related U.S. Application Data

(63) Continuation of application No. 11/589,339, filed on Oct. 30, 2006, now Pat. No. 7,454,970, which is a continuation of application No. 11/082,493, filed on Mar. 16, 2005, now Pat. No. 7,155,973, which is a continuation of application No. 10/615,076, filed on Jul. 8, 2003, now Pat. No. 6,883,373, which is a continuation of application No. 09/282,755, filed on Mar. 31, 1999, now Pat. No. 6,618,646.

(51) Int. Cl.
*G01M 1/00* (2006.01)
(52) U.S. Cl. ............... 73/462; 700/279; 700/164
(58) Field of Classification Search .......... 73/460, 73/462; 700/56–58, 164, 279, 280
See application file for complete search history.

(56) References Cited

U.S. PATENT DOCUMENTS

| | | | |
|---|---|---|---|
| 3,311,734 A | | 3/1967 | Peterson |
| 3,861,025 A * | | 1/1975 | Sims .................... 29/593 |
| 3,920,956 A | | 11/1975 | Endo et al. |
| 4,319,151 A * | | 3/1982 | Klotz ..................... 310/152 |
| 4,340,948 A * | | 7/1982 | Goodnight .............. 368/158 |
| 4,410,794 A | | 10/1983 | Williams |
| 4,425,511 A | | 1/1984 | Brosh |
| 4,432,253 A * | | 2/1984 | Kerlin ..................... 322/40 |
| 4,435,770 A * | | 3/1984 | Shiohata et al. ......... 702/56 |
| 4,550,428 A * | | 10/1985 | Yanagishima et al. .... 381/86 |
| 4,588,875 A | | 5/1986 | Kozak et al. |
| 4,626,147 A * | | 12/1986 | Nystuen et al. ......... 409/133 |
| 4,684,944 A * | | 8/1987 | Kerlin ................ 340/825.66 |
| 4,773,019 A * | | 9/1988 | Martin et al. ............ 700/279 |
| 4,795,877 A | | 1/1989 | Bridgstock et al. |
| 4,817,003 A * | | 3/1989 | Nagase et al. ........... 701/124 |
| 4,906,820 A | | 3/1990 | Haarmann et al. |

(Continued)

FOREIGN PATENT DOCUMENTS

DE          3720746 A1    1/1989

(Continued)

*Primary Examiner* — Hezron E Williams
*Assistant Examiner* — Samir M Shah
(74) *Attorney, Agent, or Firm* — Richard G. Miller

(57) ABSTRACT

A balance assembly for a rotating assembly comprising: a first movable rotor and a second movable rotor which are selectively movable about the rotating assembly; and a controller with a microprocessor operating with stored control programs for controlling movement of the first movable rotor and second movable rotor and adapted to calculate a value and to periodically modify the value and to cause the first movable rotor and the second movable rotor to move in accordance with the calculated value and the modified value, wherein the values are adjusted during a plurality of control iterations to reduce vibrational signals from an at least one vibration sensor.

5 Claims, 18 Drawing Sheets

U.S. PATENT DOCUMENTS

| | | | |
|---|---|---|---|
| 4,977,510 A * | 12/1990 | Winzenz et al. | 701/124 |
| 4,983,915 A * | 1/1991 | Rossi | 324/207.17 |
| 5,109,223 A | 4/1992 | Schmitt et al. | |
| 5,130,589 A | 7/1992 | Kanemitsu | |
| 5,144,862 A * | 9/1992 | Giberson et al. | 74/433.5 |
| 5,161,414 A * | 11/1992 | Rubbelke | 73/658 |
| 5,168,187 A * | 12/1992 | Baer et al. | 310/49.12 |
| 5,172,325 A * | 12/1992 | Heidari | 701/124 |
| 5,231,265 A * | 7/1993 | Hackett et al. | 219/494 |
| 5,240,358 A * | 8/1993 | Hackett et al. | 409/141 |
| 5,241,298 A | 8/1993 | Lian et al. | |
| 5,412,583 A * | 5/1995 | Cameron et al. | 700/279 |
| 5,421,199 A * | 6/1995 | Himmler | 73/462 |
| 5,453,598 A * | 9/1995 | Hackett et al. | 219/503 |
| 5,505,684 A * | 4/1996 | Piramoon | 494/16 |
| 5,540,615 A * | 7/1996 | Murtuza | 451/343 |
| 5,544,073 A * | 8/1996 | Piety et al. | 700/279 |
| 5,688,160 A | 11/1997 | Pozzetti et al. | |
| 5,992,232 A * | 11/1999 | Saitoh | 73/468 |
| 6,065,338 A | 5/2000 | Stoiber et al. | |
| 6,618,646 B1 * | 9/2003 | Dyer | 700/279 |
| 6,789,422 B1 * | 9/2004 | Ward, Jr. | 73/462 |
| 6,883,373 B2 * | 4/2005 | Dyer | 73/462 |
| 7,065,428 B2 * | 6/2006 | Baran et al. | 700/174 |
| 7,155,973 B2 * | 1/2007 | Dyer | 73/462 |
| 7,252,000 B2 * | 8/2007 | Care et al. | 73/462 |
| 7,418,432 B2 * | 8/2008 | Calise et al. | 706/23 |
| 7,448,854 B2 * | 11/2008 | Jolly et al. | 416/1 |
| 7,506,545 B1 * | 3/2009 | Larson et al. | 73/462 |
| 7,599,804 B2 * | 10/2009 | Pecher | 702/39 |
| 7,717,013 B2 * | 5/2010 | Hildebrand et al. | 74/574.2 |
| 7,722,322 B2 * | 5/2010 | Altieri et al. | 416/1 |

FOREIGN PATENT DOCUMENTS

| | | |
|---|---|---|
| DE | 4337001 A1 | 5/1995 |
| JP | 55-083829 | 6/1980 |
| JP | 63-256829 | 10/1988 |
| JP | 01-094225 | 4/1989 |
| JP | 02-130442 | 5/1990 |
| JP | 02-292171 | 12/1990 |
| JP | 03-279836 | 12/1991 |
| JP | 05-253836 | 10/1993 |
| JP | 05-281076 | 10/1993 |
| JP | 08-219927 | 8/1996 |
| JP | 8-508096 | 8/1996 |
| JP | 09-280250 | 10/1997 |
| JP | 10-508354 | 8/1998 |
| JP | 2002-515832 | 5/2002 |
| WO | 95/34871 | 12/1995 |
| WO | 96/17294 | 6/1996 |

* cited by examiner

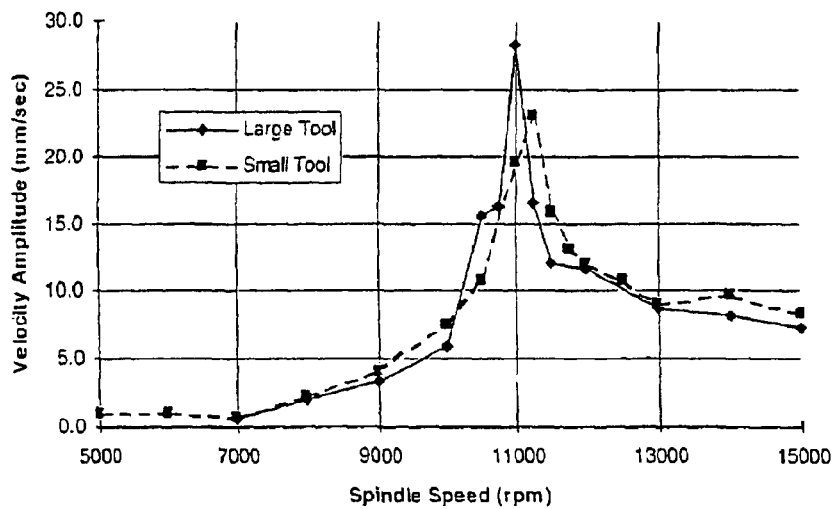
Figure 2 Vibration Sensitivity of MFW2612/15 Spindle To Maximum Capacity Balance Correction
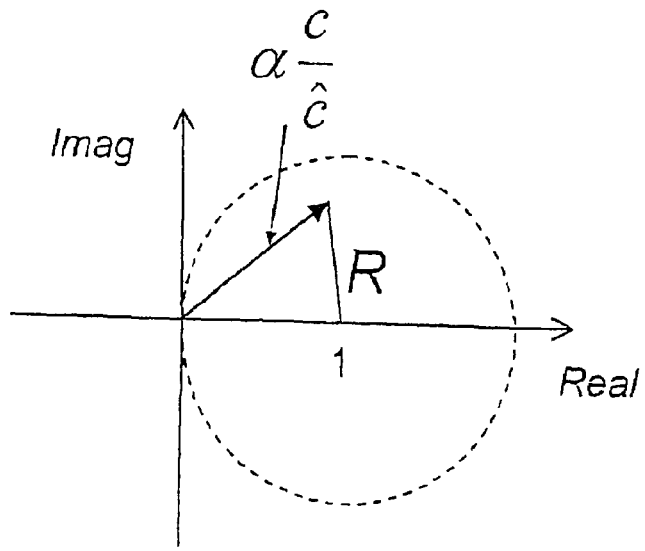
Figure 3.1 Single-Plane Active Balancing Control Stable For All Values of $\alpha \frac{c}{\hat{c}}$ Falling Within the Unit Circle In The Right Half Complex Plane (R < 1)

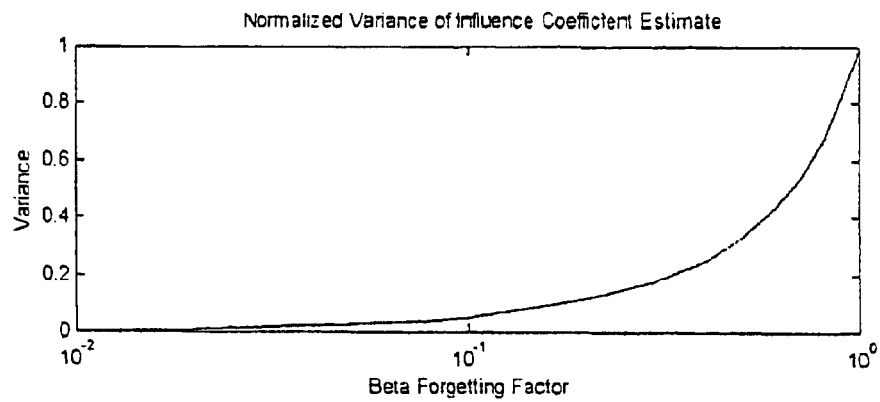
Figure 3.2 Beta Forgetting Factor with a Normalized Variance of Coefficient Estimate
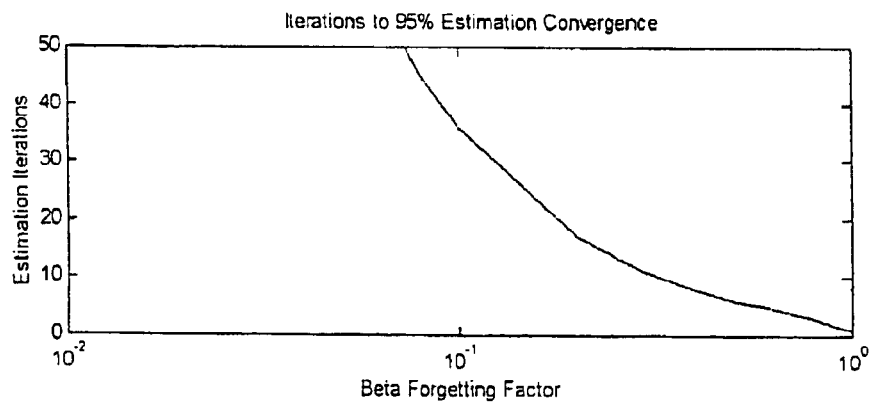
Figure 3.3 Influence Coefficient Estimation Performance for Various Values of the $\beta$ "Forgetting Factor"

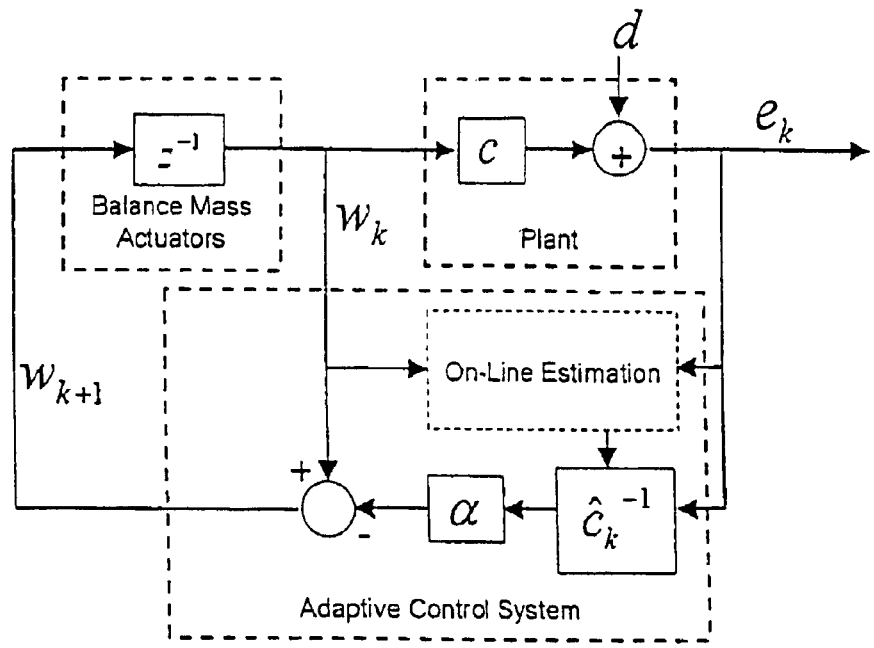
Figure 3.4 Adaptive Influence Coefficient Control Block Diagram
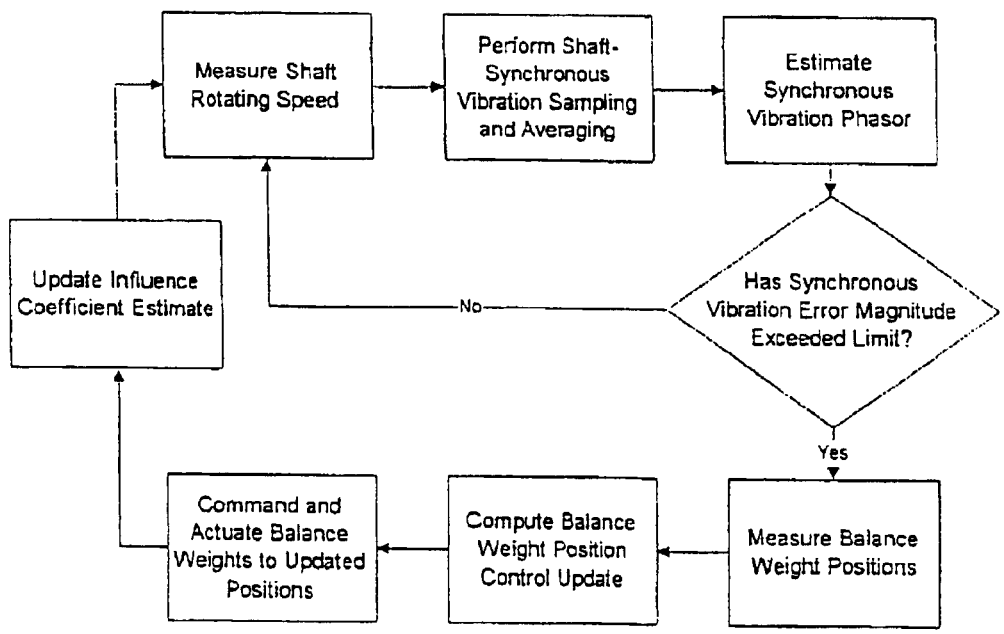
Figure 3.5 Flow Chart of Experimental Single-Plane Active Balancing Control System

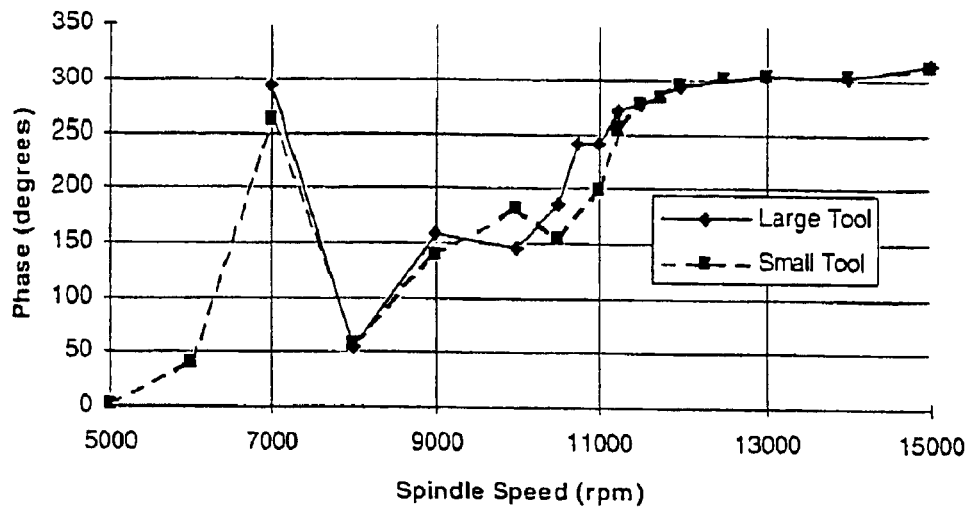
Figure 3.6 Vibration Sensitivity Phase Angle of MFW2612/15 Spindle
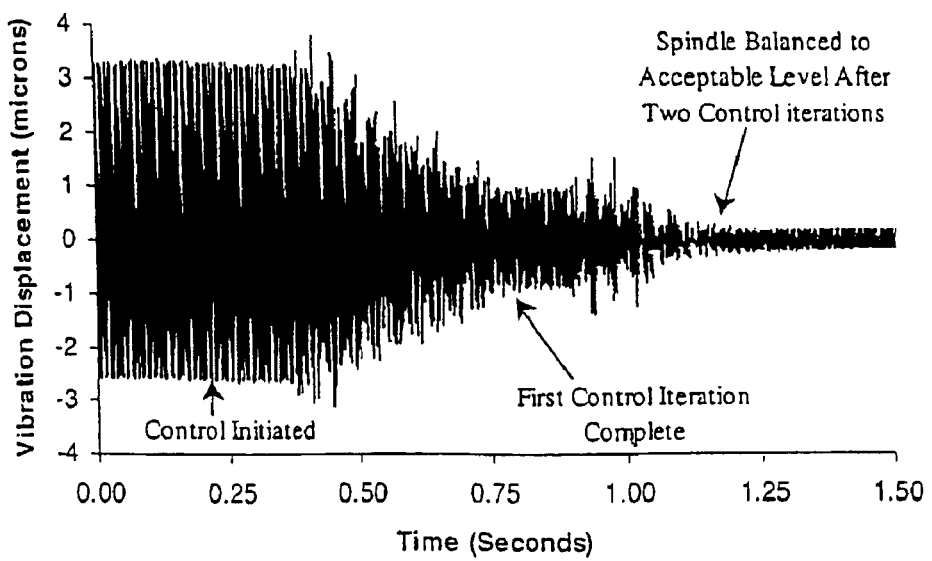
Figure 3.7 Measured Spindle Housing Vibration During Active Balancing of Nonlinear System

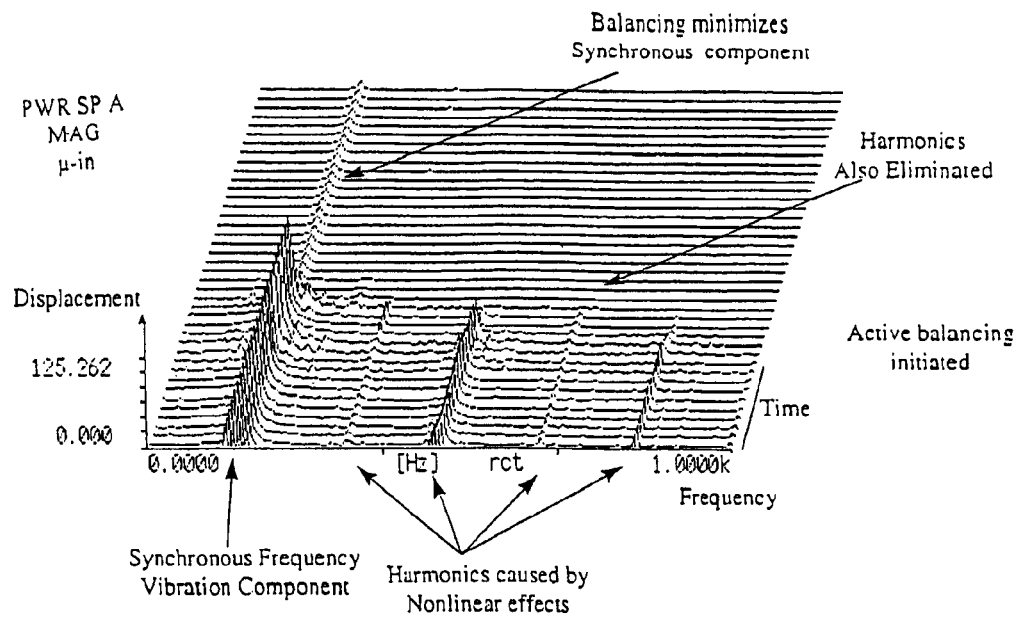
Figure 3.8 Measured Time-Frequency Spectrum of Spindle Housing Vibration Showing Broadband Effect of Active Balancing of Nonlinear System
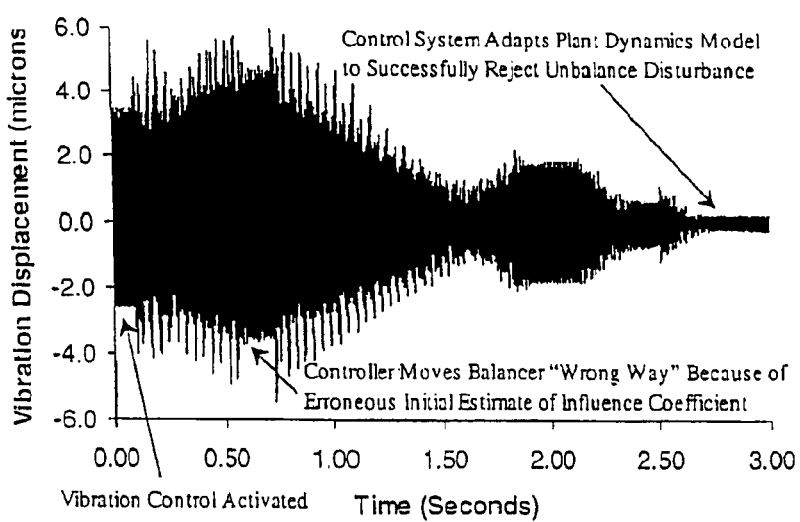
Figure 3.9 Measured Spindle Housing Vibration During Single-Plane Adaptive Active Balancing With Inaccurate Initial Influence Coefficient Estimate

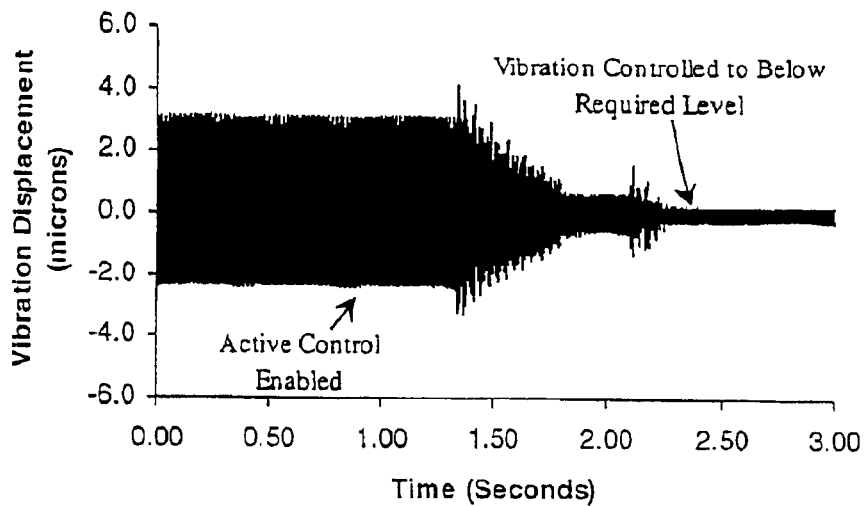
Figure 3.10 Measured Spindle Housing Vibration During Single-Plane Active Balancing After Adaptive System "Learning"
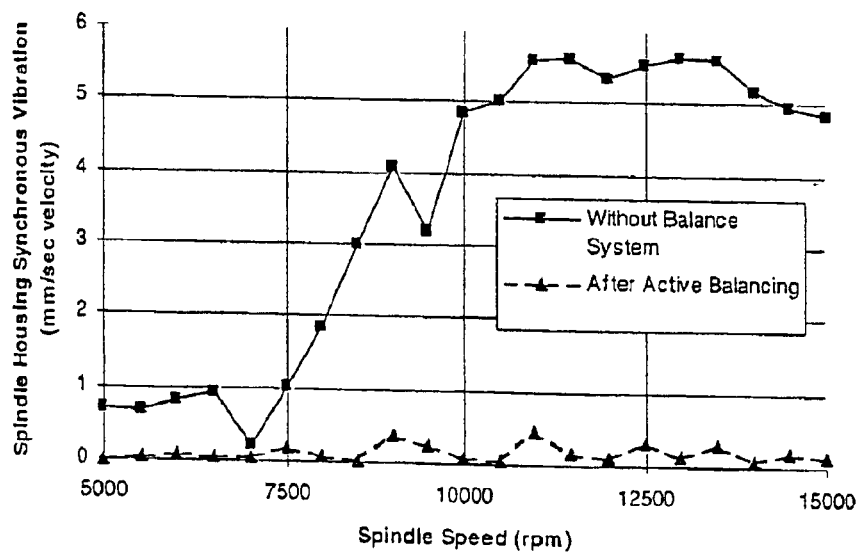
Figure 3.11 Measured Spindle Vibration Before and After Adaptive Active Balancing at Various Spindle Speeds

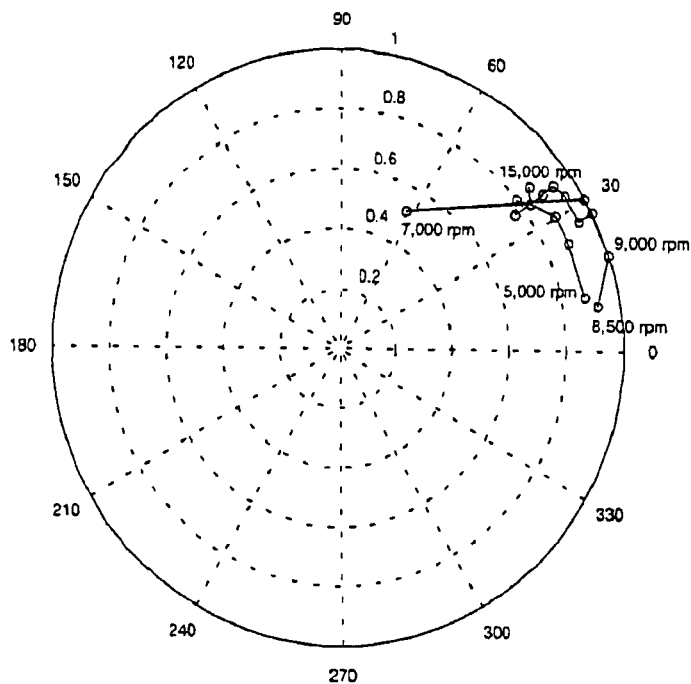
Figure 3.12 Normalized Magnitude and Phase of Balance Correction Required to Minimi Vibration at Each Spindle Speed
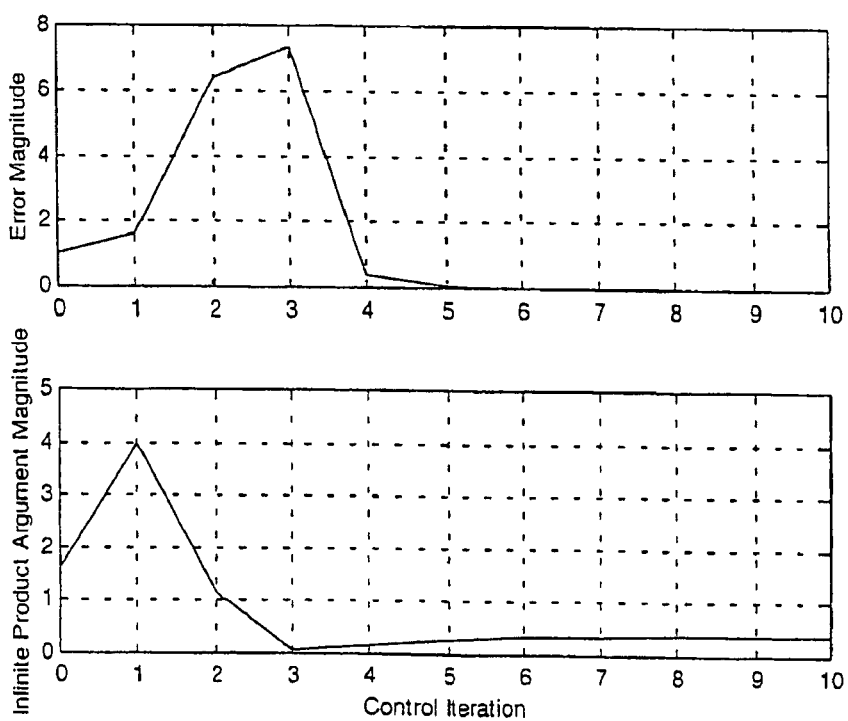
Figure 4.1 Example Simulated Adaptive Control Response and Infinite Product Argument Magnitude of Eq. (4.2) For $\hat{c}_0 = -c$, $\alpha = 0.6$, and $\beta = 0.4$

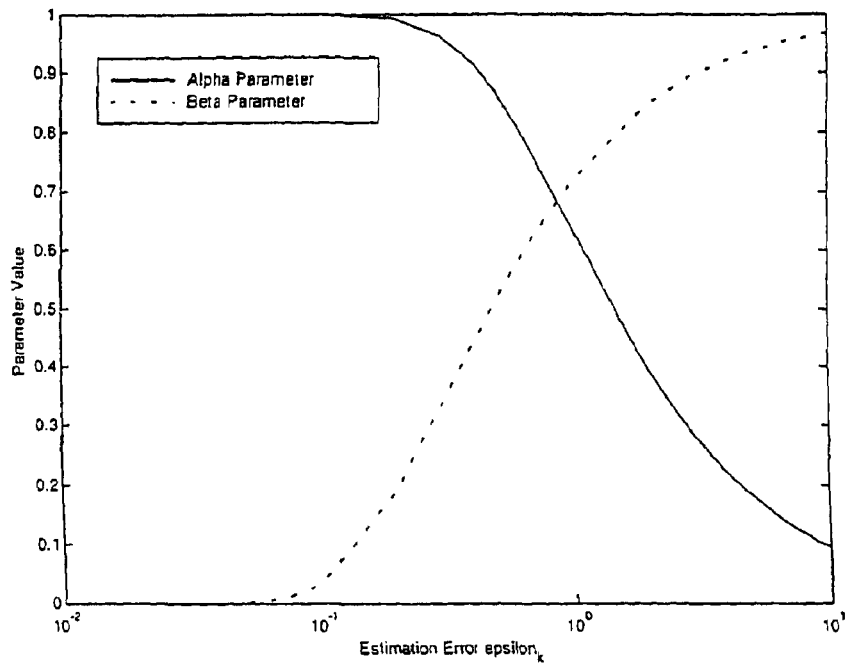
Figure 4.2 Automatically Tuned Parameter Values as Functions of Influence Coefficient Estimation Convergence Error (for $\eta_\alpha = 1$, and $\eta_\beta = 3$ )
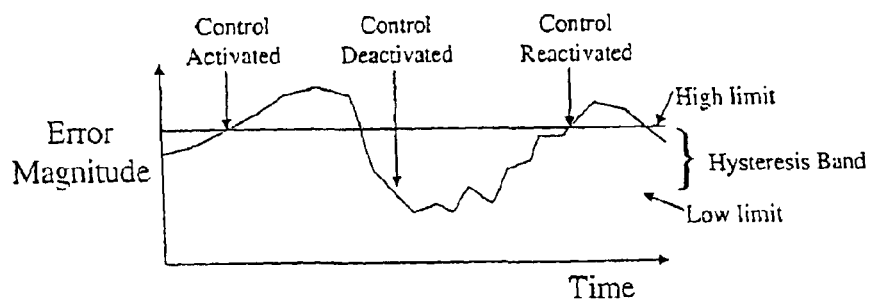
Figure 4.3 Hysteresis Band Between the Supervisory Limits Reduces Spurious Control Activation

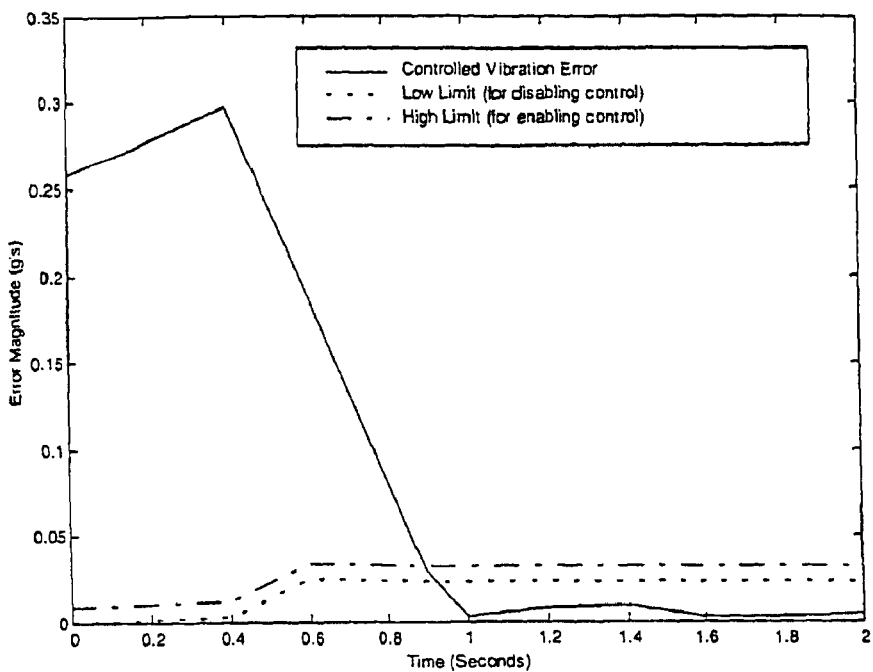
Figure 4.4 Experimental Results Using Automatic Supervisory Control Limit Setting With Auto-Tuning Active Balancing System
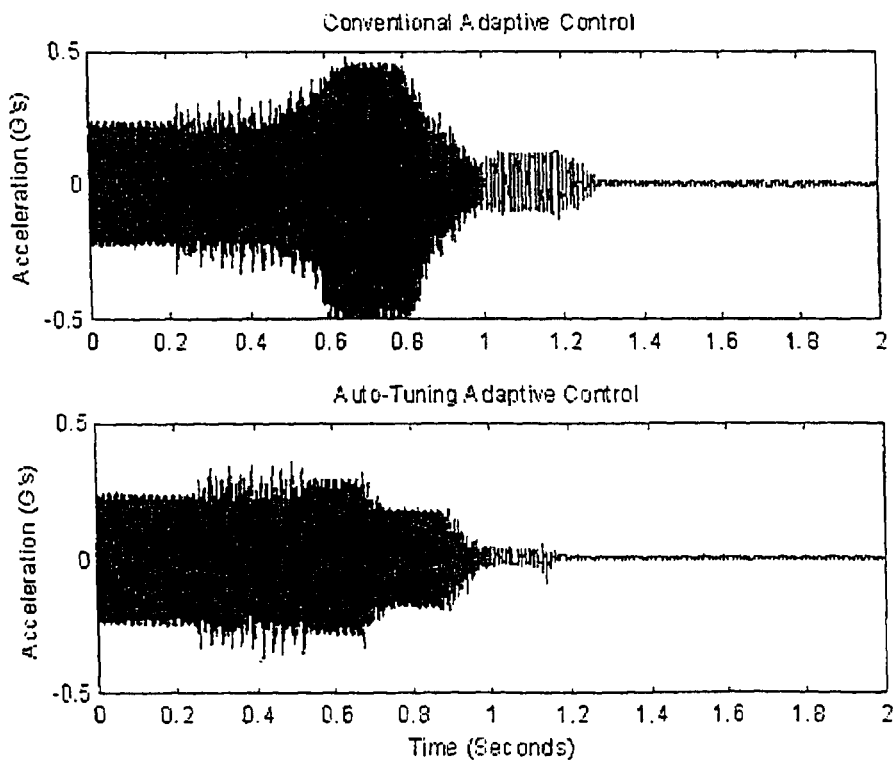
Figure 4.5 Spindle Housing Vibration During Active Balancing Using Conventional Fixed Parameter Adaptive Control and Auto-Tuning Adaptive Control With Erroneous Initial Influence Coefficient Estimates

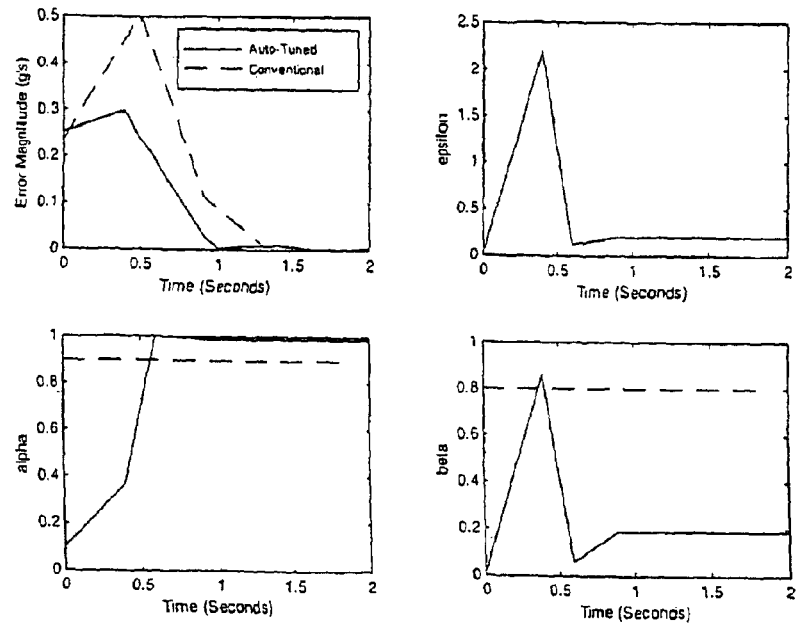

Figure 4.6 Comparison of Active Balancing Control Performance of Auto-Tuning Control and Conventional Fixed Parameter Adaptive Control With Erroneous Initial Influence Estimates

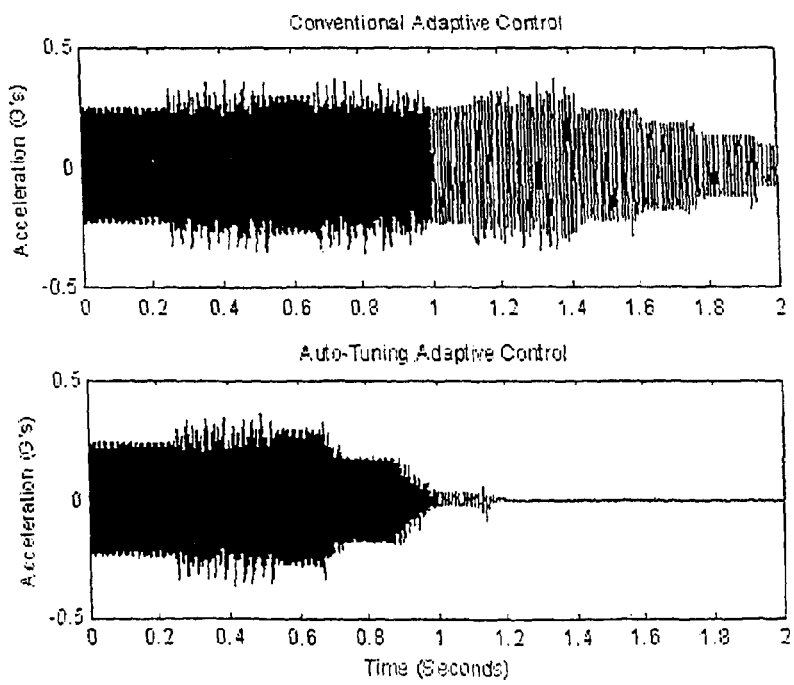

Figure 4.7 Spindle Housing Vibration During Active Balancing Using Cautious Conventional Fixed-Parameter Adaptive Control and Auto-Tuning Adaptive Control With Erroneous Initial Influence Coefficient Estimates

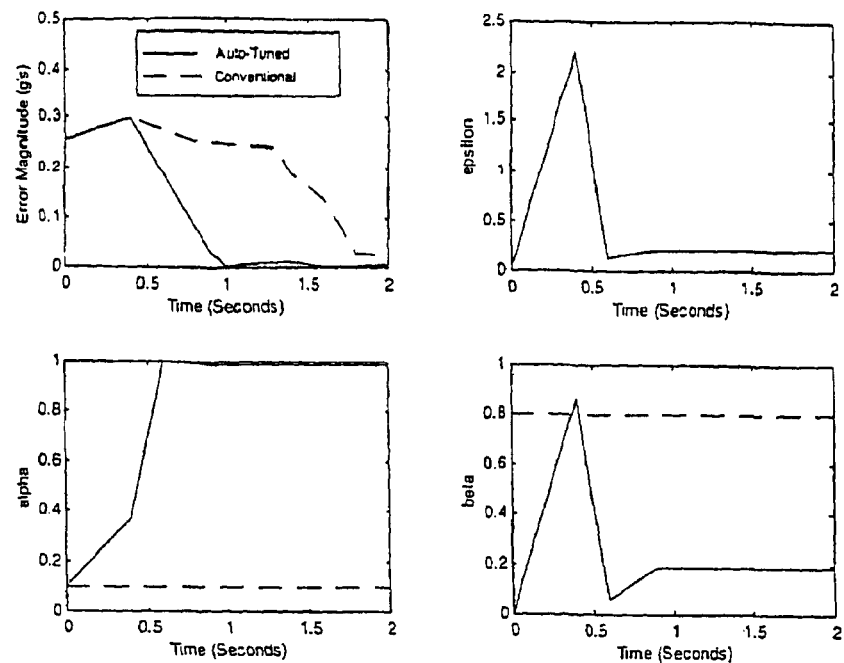

Figure 4.8 Comparison of Active Balancing Control Performance Using Cautious Conventional Fixed-Parameter Adaptive Control Auto-Tuning Control and With Erroneous Initial Influence Estimates

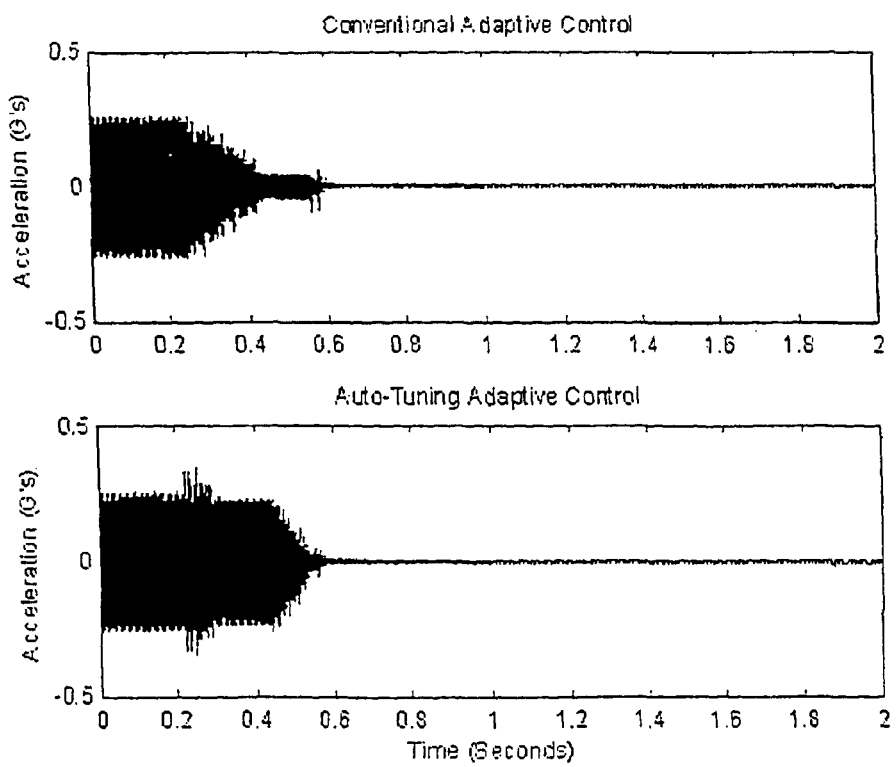

Figure 4.9 Spindle Housing Vibration During Active Balancing Using Conventional Adaptive Control and Auto-Tuning Adaptive Control With Accurate Initial Influence Coefficient Estimates

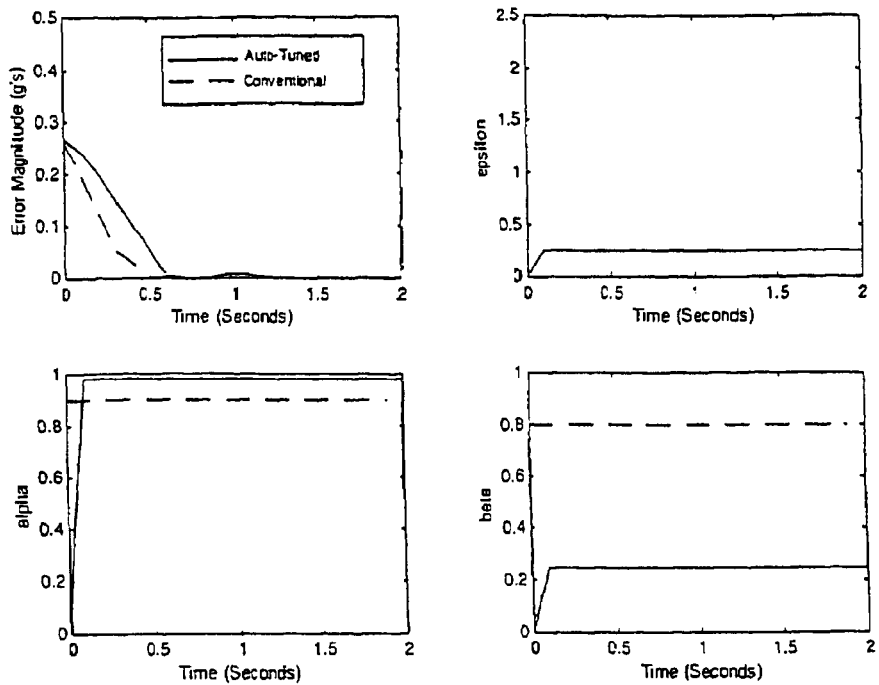
Figure 4.10 Comparison of Active Balancing Control Performance of Conventional Fixed-Parameter Adaptive and Control Auto-Tuning Control With Accurate Initial Influence Coefficient Estimates
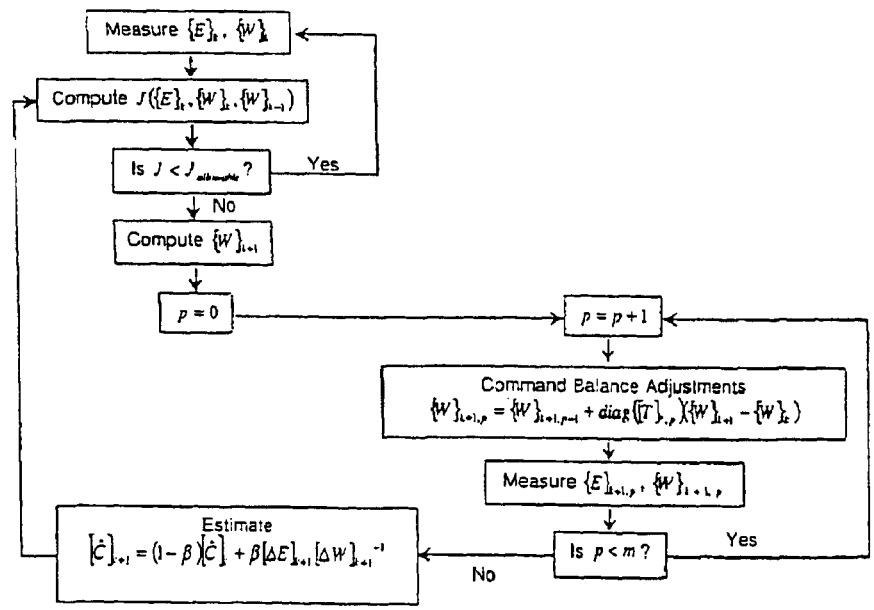
Figure 5.1 Flow Chart of Supervisory Adaptive Optimal Control for Multiple-Plane Active Balancing Systems Figure 5.2 Average Measured Active Balancing Influence Matrix At 3,100 Rpm (Influence Units Are Mils Peak-To-Peak Per 100% Balance Capacity)

$$\begin{Bmatrix} \text{Drive End}_y \\ \text{Outboard}_y \\ \text{Drive End}_x \\ \text{Outboard}_x \end{Bmatrix} = \begin{bmatrix} 1.2\angle 178° & 4.2\angle 228° \\ 4.9\angle 343° & 1.3\angle 152° \\ 1.0\angle 152° & 5.2\angle 142° \\ 4.2\angle 78° & 1.4\angle 226° \end{bmatrix} \begin{Bmatrix} \text{Drive End} \\ \text{Outboard} \end{Bmatrix}$$

| Sensor | Influence (mils p - p) | Active Balance Plane |

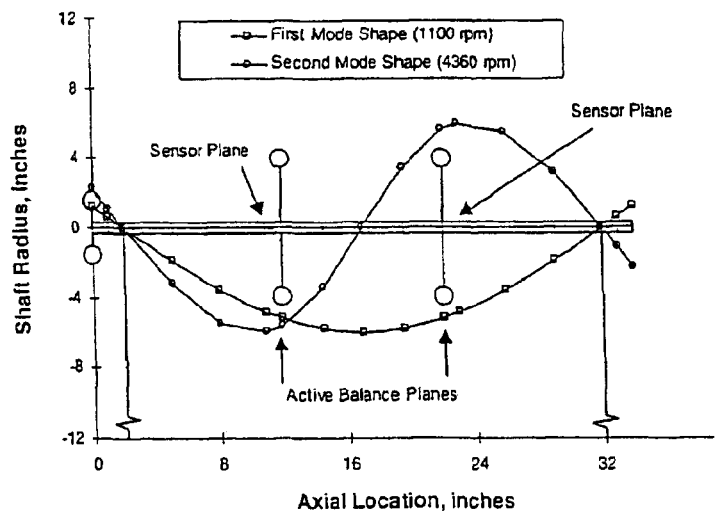

Figure 5.3 Predicted Mode Shapes of Flexible Rotor Test Rig for First Two Critical Speeds

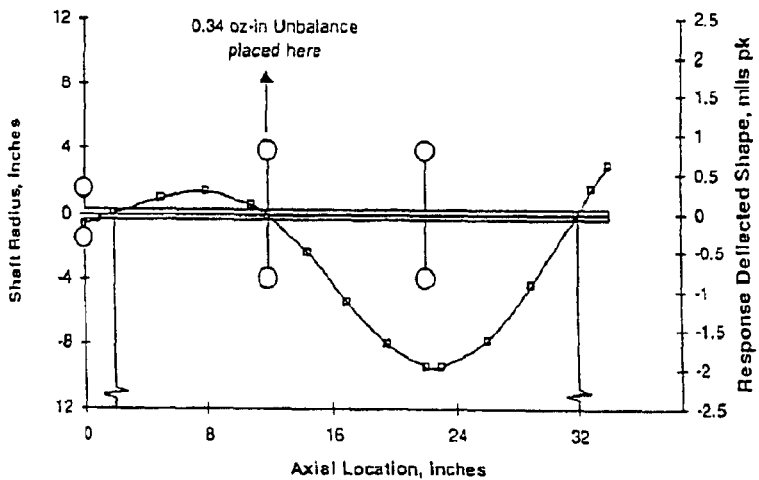
Figure 5.4 Predicted Forced Response Deflected Shape Of Rotor At 3,100 Rpm Due To 0.34 Oz-In Unbalance At Drive-End Active Balancing Plane
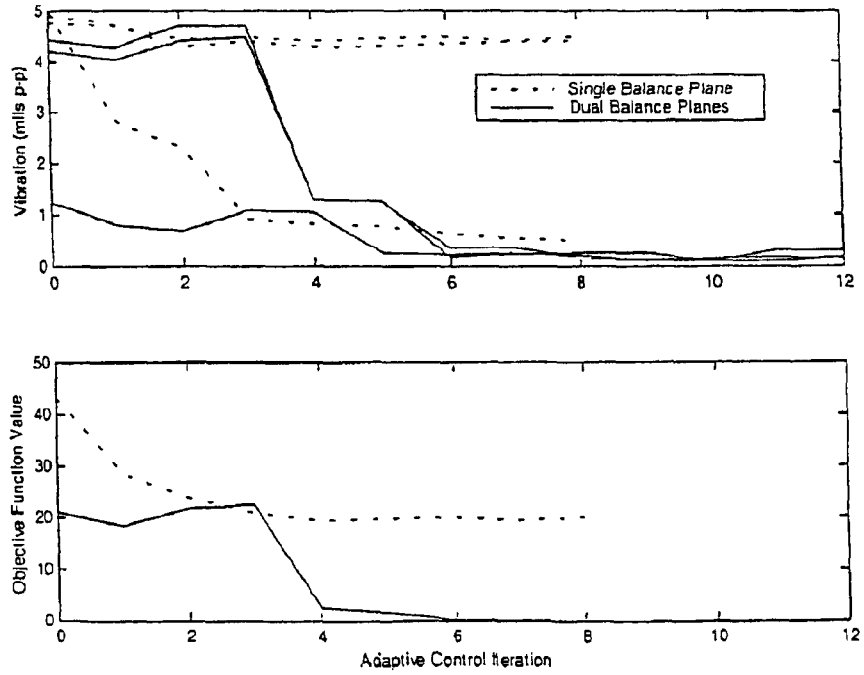
Figure 5.5 Comparison of Adaptive Optimal Control Results Using Single-Plane and Dual-Plane Active Balancing

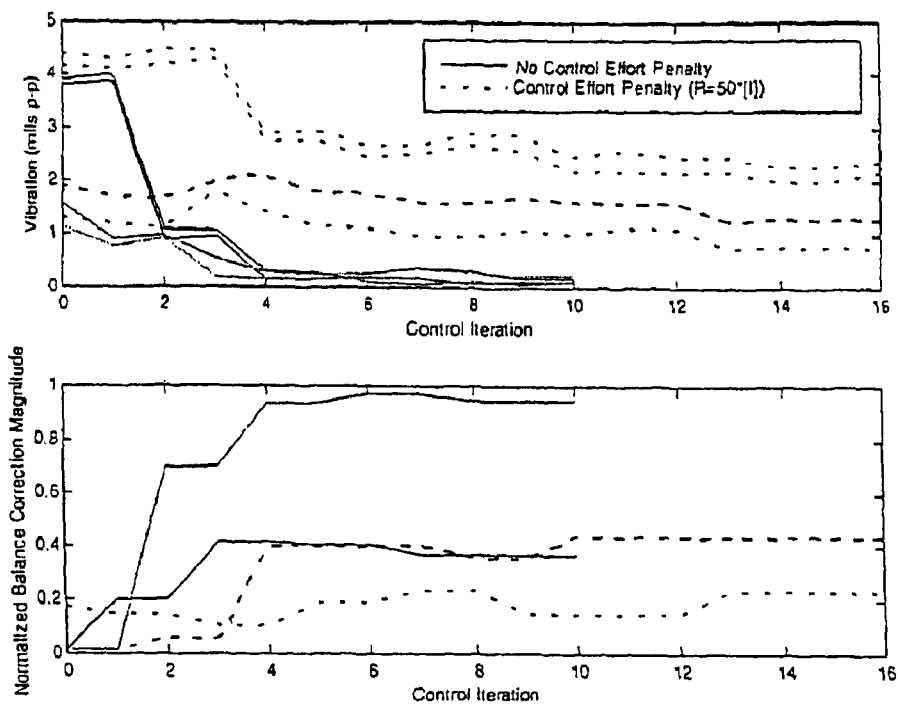
Figure 5.6 Comparative Results of Adaptive Optimal Control With and Without Control Effort Penalty
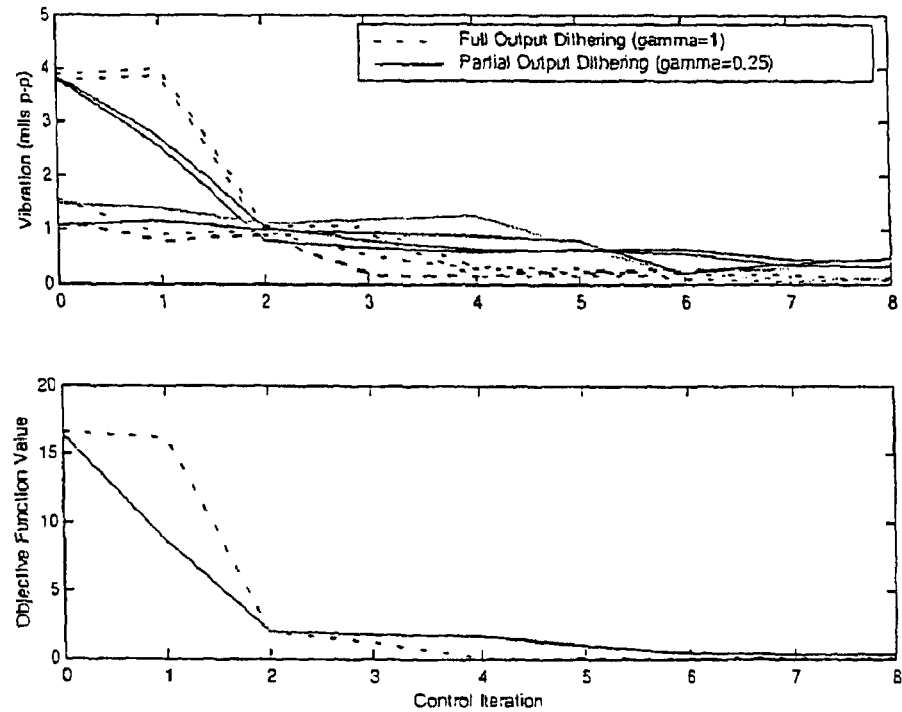
Figure 5.7 Results of Adaptive Optimal Control of Lightly Cross-Coupled System Using Full and Partial Control Dithering

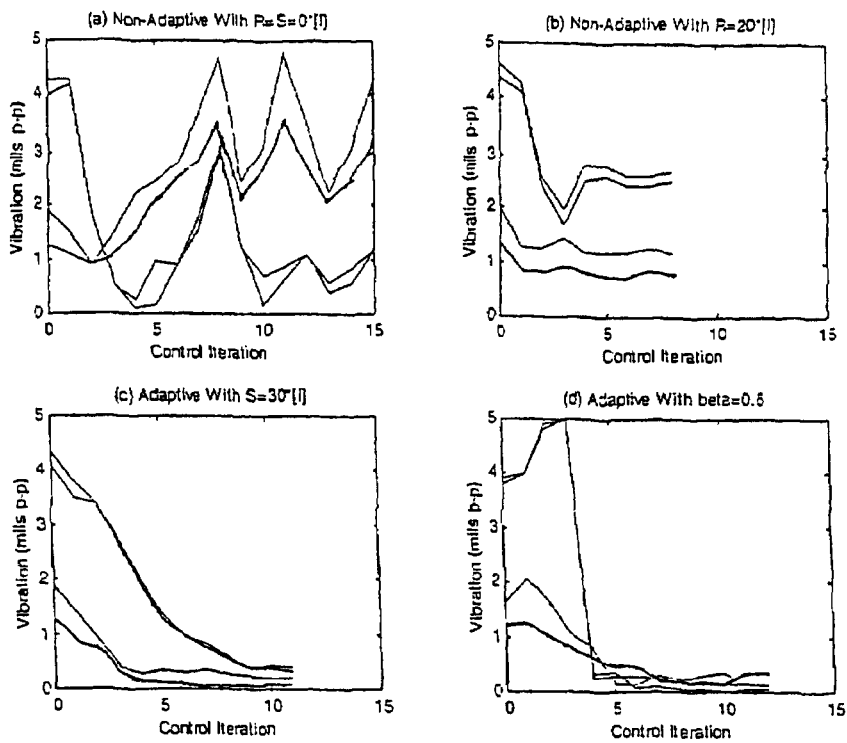
Figure 5.8 Dual-Plane Optimal Active Balancing Control Results for Somewhat Inaccurate Initial Influence Matrix Estimate
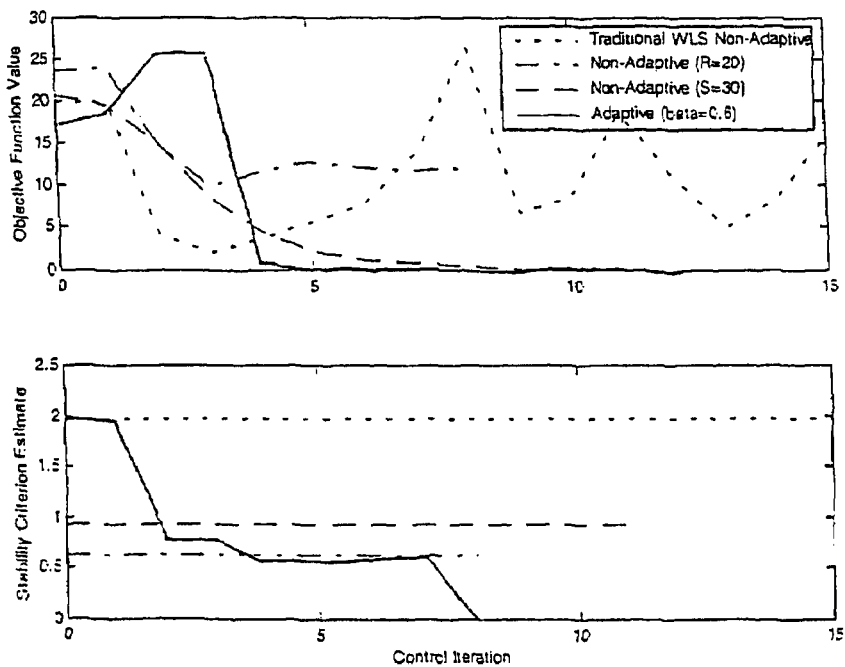
Figure 5.9 Objective Function Response and Estimated Stability Criterion During Optimal Active Balancing Control With Moderately Inaccurate Initial Influence Matrix Estimate

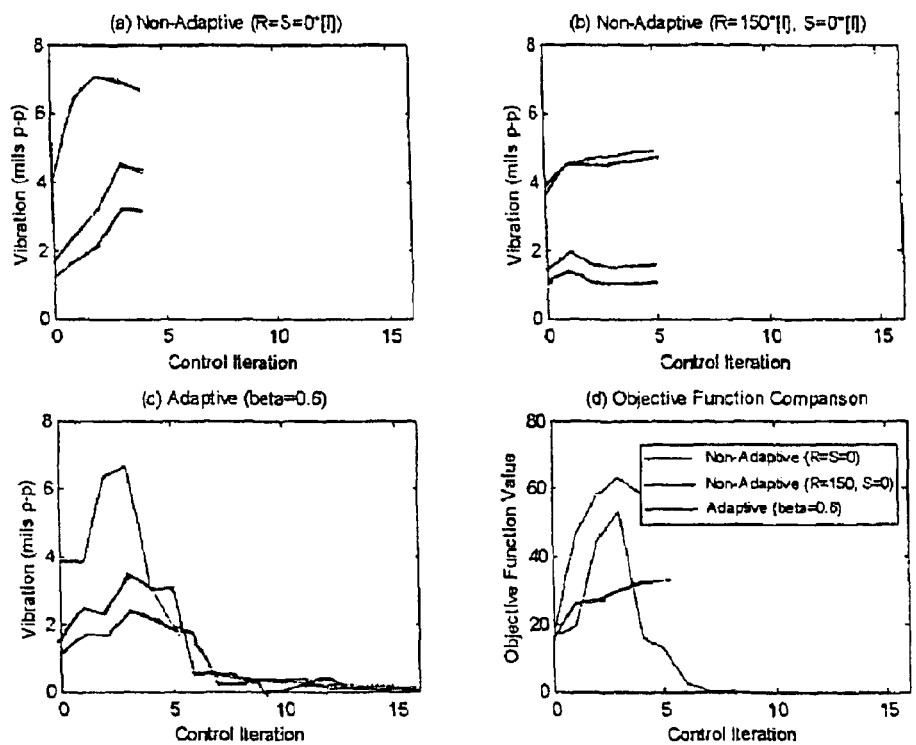
Figure 5.10 Results Of Non-Adaptive And Adaptive Optimal Control With Highly Inaccurate Influence Matrix Estimate

METHOD AND APPARATUS FOR BALANCING

This application is a continuation of co-pending non-provisional application Ser. No. 11/589,339, filed on Oct. 30, 2006, which issued as U.S. Pat. No. 7,454,970; which is a continuation of non-provisional application Ser. No. 11/082,493, filed on Mar. 16, 2005, which issued as U.S. Pat. No. 7,155,973; which is a continuation of non-provisional application Ser. No. 10/615,076, filed on Jul. 8, 2003, which issued as U.S. Pat. No. 6,883,373; which is a continuation of non-provisional application Ser. No. 09/282,755 filed on Mar. 31, 1999, which issued as U.S. Pat. No. 6,618,646, incorporated herein by reference.

BACKGROUND OF THE INVENTION (1) Field of the Invention

This invention generally relates to a method and an apparatus for balancing and more particularly to a method and to an apparatus for balancing a rotating machine tool and/or rotating/moving machine tool assembly.

(2) Background of the Invention

Machine tool assemblies are used to create and/or to form various parts, products, and other types of entities and/or apparatuses. Particularly, these apparatuses include tools which are usually and removably placed, by means of a tool holder, upon a rotating or moving spindle and which are adapted to engage a workpiece or other apparatus and to engagingly form the workpiece into a desired shape and size. While these machine tool assemblies adequately create the desired parts, products, and/or other entities they are prone to imbalance failure and/or imbalance error. Hence, the precision and reliability of these relatively high-speed machine tool assemblies is limited by the imbalance which exists and/or arises as the assembly is used (e.g. as the tool is engaging rotated and/or moved against the workpiece). Similar types of unbalance or imbalance difficulties arise in the rotation and the utilization of relatively high-speed turbomachinery which is used in a variety of manufacturing and electrical power generation facilities and which causes the loss of significant revenues if "shut down" and/or disabled for even a relatively brief period of time.

Some balancing devices have been created and utilized in order to overcome these imbalance difficulties. While somewhat effective, these prior balancing devices and methodologies suffered from various drawbacks. For example and without limitation, many of these prior balancers required that the tool assembly and/or rotating machinery be stopped or "interrupted" before a balance was achieved. This "interruption" or "off line" balance was and remains relatively costly and highly inefficient. Some of the other prior balancing devices and methodologies experienced and/or caused a relatively high, although oftentimes temporary, increase in the overall vibration or imbalance level as the balance "correction" was implemented. This transitory high vibration level was usually caused by the movement of the balancing portion of the assembly to a new balancing position and oftentimes caused the tooling assembly to be imprecise and to fail even before overall balance was achieved. The very act of balancing the assembly causes the assembly to fail or perform in an undesirable manner. Further, many of these prior balancers did not and do not adjust the imbalancing "thresholds" (e.g. the vibration values at which balancing was and/or is to begin and end) during the "working life" and for various speeds of the machine. Hence, as the machine (tooling assembly) ages and as the machine and/or tooling assembly employs a variety of speeds its needs for balancing changes. Unfortunately, these new and different balancing needs were not and are not properly reflected by these prior deployed balancer assemblies.

There is therefore a need for a method and a balancing apparatus to allow for the relatively efficient balancing of a machine tool assembly, a relatively high-speed turbomachine assembly, or virtually any other rotating and/or moving machine and/or apparatus and which substantially prevents temporary vibration level increases during balancing and which allows balancing thresholds to be dynamically modified over the "working life" of the machine. Applicant's invention addresses these needs and these aforedescribed drawbacks of these prior art balancing devices and methodologies in a new and novel fashion. Importantly, Applicant's invention is not limited to the balancing of a machine tool assembly. Rather, Applicant's invention is directed to the balance of any moving and/or rotating member.

SUMMARY OF THE INVENTION

It is a first object of the invention to provide a method and an apparatus for balancing.

It is a second object of the invention to provide a method and an apparatus for balancing which overcomes some or all of the various drawbacks of the prior balancing apparatuses and methodologies, including for example and without limitation, those which have been previously delineated above.

It is a third object of the invention to provide a method and an apparatus for balancing which overcomes the various drawbacks associated with prior balancing apparatuses and methodologies and which allows for the dynamic balancing of a tool assembly and/or other types of rotating machinery and apparatuses.

According to a first aspect of the present invention a balancer is provided. The balancer, according to this first aspect of the present invention, includes a balancer to selectively balance unbalance in a rotating tool assembly; and control means, connected to the balancer, for causing said balancer to calculate an influence coefficient of the rotating tool assembly and to thereafter selectively balance the rotating tool assembly by the movement of the balancer, movement being defined by said calculated influence coefficient.

According to a second aspect of the present invention a balancer is provided. The balancer includes a balancing means to selectively balance a rotating tool assembly; and control means, coupled to said balancing means, for dynamically calculating vibration levels necessary for said balancing to begin and to end.

Further objects, features, and advantages of the present invention will become apparent from a consideration of the following detailed description of the preferred embodiment of the invention, the claims, and the attached drawings.

According to a third aspect of the invention, a balancer methodology is provided. This methodology includes the steps of a method of balancing a tool assembly by selectively employing a balance weight correction to said tool assembly, said method comprising the steps of employing a first balance weight correction to said tool assembly, measuring an amount of vibration associated with said balance tool assembly, estimating an influence coefficient value of said tool assembly, dividing said measured amount of vibration by said estimate influence coefficient thereby creating a certain value; multiplying said certain value by a gain parameter value, thereby creating a second certain value and subtracting said second certain value from said first balance weight correction, thereby creating a new balance weight correction and applying said new balance weight connection to said tool assembly.

According to a fourth aspect of the present invention, a balancer is provided which substantially reduces and/or eliminates transitory vibration increases.

Further objects, features and advantages of the present invention will become apparent from a consideration of the following detailed description of the preferred embodiment of the invention, these included and subjoined claims and the attached drawing.

BRIEF DESCRIPTION OF THE DRAWINGS

The following drawing is useful in understanding the nature and the operation of the preferred embodiment of the invention. The drawing is as follows:

FIG. 2 is a graph of the vibration sensitivity of a particular spindle to maximum capacity balance correction.

FIG. 3.1 is a graph of a single active balancing control stable for all values of the gain multiplied by the quotient of the actual and estimated influence coefficients which are falling with the unite circle in the right half complex plane.

FIG. 3.2 is a graph of the forgetting factor with a normalized variance of influence coefficient estimate.

FIG. 3.3 is a graph of the number of estimation iterations required for 95% convergence of the estimate for varying forgetting factor values.

FIG. 3.4 is a schematic block diagram of an adaptive influence coefficient control system.

FIG. 3.5 is a flow chart of experimental single place active balancing control system.

FIG. 3.6 is a graph of vibration sensitivity phase angle of the particular spindle shown in FIG. 2.

FIG. 3.7 is a graph of the measure spindle housing vibration during active balancing of a nonlinear system.

FIG. 3.8 is a graph of the measured time-frequency spectrum of spindle housing vibration showing broadband effect of active balancing of nonlinear systems.

FIG. 3.9 is a graph of measured spindle housing vibration during single-plane adaptive balancing with an inaccurate initial influence coefficient estimate.

FIG. 3.10 is a graph of measured spindle housing vibration during single-plane adaptive system "learning".

FIG. 3.11 is a graph of measured spindle housing vibration before and after adaptive active balancing at various spindle speeds.

FIG. 3.12 is a graph of the normalized magnitude and phase of balance correction required to minimize vibration at each spindle speed.

FIG. 4.1 is a graph of simulated adaptive control response and infinite argument magnitude of equation 4.2.

FIG. 4.2 is a graph of the automatically tuned parameter values as functions of influence coefficient estimation error.

FIG. 4.3 is graph of the hysteresis band between the supervisory limits which reduce spurious control activation.

FIG. 4.4 is a graph of the experimental results using automatic supervisory control limit setting with auto-tuning active balance system.

FIG. 4.5 is a pair of graphs of spindle housing vibration during active balancing using conventional fixed parameter adaptive control and auto-tuning adaptive control with erroneous initial influence coefficient estimates.

FIG. 4.6 is a collection of graphs comparing active balancing control performance of auto-timing control and conventional fixed parameter adaptive control with erroneous initial influence coefficient estimates.

FIG. 4.7 is a pair of graphs depicting spindle housing vibration during active balancing using cautious conventional fixed-parameter adaptive control and auto-tuning adaptive control with erroneous initial influence coefficient estimates.

FIG. 4.8 is a collection of graphs comparing active balancing control performance using cautious conventional fixed-parameter adaptive control auto-tuning with erroneous initial influence estimates.

FIG. 4.9 is a pair of graphs depicting spindle housing vibration during active balancing using conventional adaptive control and auto-tuning adaptive control with accurate initial influence coefficient estimates.

FIG. 4.10 is a collection of graphs comparing active balancing control performance of conventional fixed-parameter adaptive and control auto-tuning control with accurate initial influence coefficient estimates.

FIG. 5.1 is a flow chart of supervisory adaptive optimal control for multiple-place active balancing systems.

FIG. 5.2 is a table of the average measured balancing influence matrix at 3,100 RPM.

FIG. 5.3 is a graph of the predicted mode shapes of a flexible rotor test rig for two critical speeds.

FIG. 5.4 is a graph of the predicted force response deflected shape of a rotor at 3,100 RPM due to 0.34 Oz-In. unbalance at drive-end active balancing plane.

FIG. 5.5 is a pair of graphs comparing adaptive optimal control results using single-place and dual place active balancing.

FIG. 5.6 is a pair of graphs comparing the results of adaptive optimal control with and without control effort penalty.

FIG. 5.7 is a pair of graphs depicting the results of fully output dithered adaptive optimal control of a lightly cross-coupled system.

FIG. 5.8 is a collection of graphs depicting the dual-plane optimal active balancing control results for a somewhat inaccurate initial influence matrix estimate.

FIG. 5.9 is a pair of graphs depicting the objective function response and estimated stability criterion during optimal active balancing control with an erroneous initial influence matrix estimate.

FIG. 5.10 is a collection of graphs depicting the results of non-adaptive and adaptive optimal control strategies.

DETAILED DESCRIPTION OF THE PREFERRED EMBODIMENT OF THE INVENTION

Figure 1:
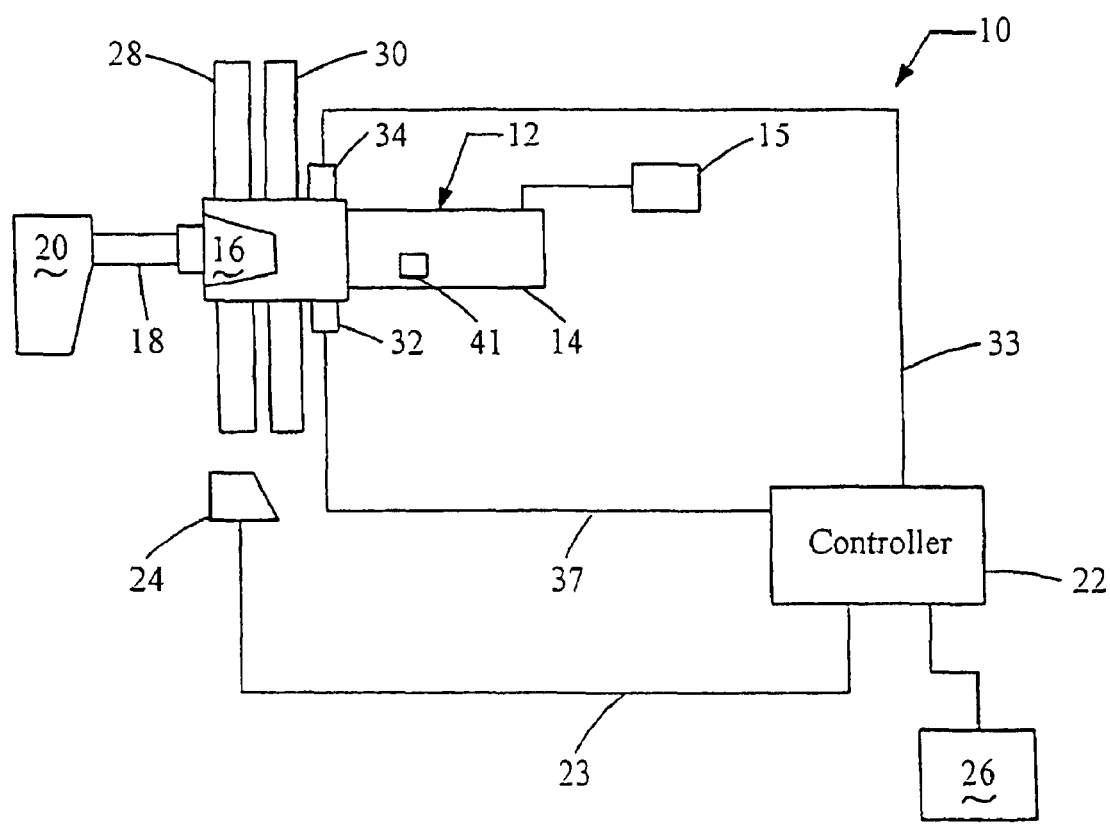
FIG. 1 is a block diagram of a balancing apparatus made and operating in accordance with the preferred embodiment of the invention and shown operatively coupled to and deployed upon a typical tool assembly.

Referring now to FIG. 1 there is shown a balancing assembly 10 shown in operative and assembled relation with a typical and conventional tool assembly 12. Assembly 10, as shown, is made in accordance and operates in accordance with the preferred embodiment of the invention.

As shown, tool assembly 12 includes a moving or selectively rotatable spindle 14 having an integral tool holder 16 into which a tool 18 is removably placed. In operation, the movement and/or rotation of spindle 14 causes the tool 18 to move and/or rotate and to engage a workpiece 20 for the purpose of "machining" the workpiece 20 into some sort of desirable shape, size, and/or geometry. As earlier explained, tool assembly 12 is subject to unbalances which cause the tool 18 to perform imprecisely and undesirably and which causes the tool 18 and/or other portions of assembly 12 to fail and/or to become fatigued.

As shown, balancer assembly 10 includes a controller 22 which in one embodiment of the invention comprises a microprocessor acting and/or operating under stored program control and an electrical driver 24 which is selectively coupled to the source of electrical power 26 through controller 22 and which is adapted to selectively couple electrical power to the balancer actuators and/or rotors 28, 30 in a manner effective to correct a measured and/or calculated unbalance condition associated with the tool assembly 12, by movement of these rotors 28, 30. Such unbalance measurement may be made by the use of one or more vibration sensors 32. Moreover, balancer assembly 10 further includes a position sensor 34 which is communicatively and operatively coupled to the controller 22 and which is adapted to provide positioning information associated with the placement and/or positioning of the rotors 28, 30, to the controller 22. Applicant's invention is directed to the manner of moving these unbalance correction rotors or other balance correction members. Thus Applicant's invention may be used with a wide variety of computerized balancing systems; each of these systems being adapted to selectively provide a balancing weight correction achieved by the movement of a certain member or members each having a certain non-symmetrical or uneven mass distribution. One example of such a balancing system 10 is shown for example and without limitation, within U.S. Pat. No. 5,757,662; which was filed on Nov. 29, 1994; which issued on May 26, 1998; which is assigned to Applicant's assignee; and which is fully and completely incorporated herein by reference, word for word and paragraph for paragraph. Another non-limiting example of a balancing system 10 is shown within U.S. Pat. No. 4,977,510; which was filed on Jul. 21, 1989; which issued on Dec. 11, 1990; which is assigned to Applicant's assignee; and which is fully and completely incorporated herein by reference, word for word and paragraph for paragraph. Yet another balancing and control system is shown within U.S. Pat. No. 5,231,265; which was filed on Sep. 28, 1990; which issued on Jul. 27, 1993; which is assigned to Applicant's assignee; and which is fully and completely incorporated herein by reference, word for word and paragraph for paragraph. The use of Applicant's improved, new, and novel balancer control methodology will now be explained in further detail.

According to Applicant's preferred balancing methodology, as shown below, an automatic and/or substantially automatic tuning mechanism is provided which is based upon two adaptive parameters which are calculated during each control iteration based upon the convergence of the influence coefficient estimate. These parameters are used to define the correction movement of the balancer 10 and/or of those movable balancer members of the balancer assemblies in order to balance a tool assembly spindle, turbomachinery, or other moving member.

The measured vibration of the tool assembly 12 can be considered to be an "error signal" that is desired to be eliminated by the use of an unbalance compensation apparatus, such as and without limitation balancer assembly 10. In the preferred embodiment of the invention, during each control iteration, vibrational data is sampled and depending upon the "level" or amount of reported unbalance, the rotors 28, 30 are moved to a certain position. That is, vibrational data emanating from the sensor(s) 32 is communicatively coupled to the balancer controller 22 where it is "recognized" and where it causes certain balance operations to occur in order to minimize the amount of unbalance present within the tool assembly 12. This "error signal" can be mathematically represented as a complex phasor having a certain phase angle (e.g. obtained by the use of a fixed target on rotating assembly which is utilized by the position sensor 34) and a magnitude.

The total vibrational error signal can be thought of as the linear and mathematical summation of all of the system "disturbances" (e.g. anything of a physical or electrical nature that might cause the tool system 12 to become unbalanced, such as and without limitation a "wearing away" of a portion of the tool holder) and of the overall effect of the balance corrections which were made to the system. Hence, Applicant has discovered that the total system vibrational error "$e_k$" can be computed as follows:

$$e_k = C(\omega)W_k + d \qquad \text{Eq. (3.1)}$$

Where "$C(\omega)$" is the influence coefficient of the tool assembly 12 and
Where "d" is the total disturbances applied to and/or resident within tool assembly 12 and where "$W_k$" is the balance weight correction applied to assembly 12 by the balancing assembly 10.

Hence, according to the relationship set forth in Equation 3.1, the vibrational error associated with and/or "reported"/calculated/measured at each control iteration is the mathematical sum of all of the disturbances present during or at that particular iteration and the mathematical multiplicative product of the balance correction made during that interval with the influence coefficient of the machine. In essence, as should now be apparent to those of ordinary skill in the balancing art, the influence coefficient "$C(\omega)$" is a measure of the total response of assembly 12 to a certain amount of unbalance correction and is calculated and/or estimated in measurement units of units of vibration per unit of unbalance. Essentially, the metric "$C(\omega)$" defines and/or is a measure of the response of the system 12 to a certain amount of applied unbalance compensation and is a transfer function. Moreover, as the assembly ages the value of this influence coefficient may change.

Assuming that the disturbance remains substantially similar across many control iterations and assuming that the amount of vibrations in the "k+1" period is relatively small, Applicant has discovered that one can develop a mathematical relationship between corrections in succeeding correction intervals. This is shown below:

$$W_{k+1} = W_k - e_k/\hat{c} \qquad \text{Eq. (3.2)}$$

where $\hat{c}$ is an estimate of the actual influence coefficient c.

Applicant has discovered that the use of a gain parameter "$\alpha$" enhances stability and when used in combination with Applicant's preferred embodiment of the invention reduces and/or substantially eliminates transitory balancing vibration increases. This is shown below:

$$w_{k+1} = w_k - \alpha \frac{e_k}{\hat{c}} \qquad \text{Eq. (3.3)}$$

This gain parameter $\alpha$ can improve control robustness to errors in the influence estimate $\hat{c}$. We can, without loss of generality, consider the disturbance d to be represented by the influence of a hypothetical unbalance u (which may include any synchronous forcing, not just unbalance) acting through some cumulative influence coefficient $c_u$ such that $$d = cc_u u \qquad \text{Eq. (3.4)}$$

Equation (3.1) can be written $$e_k = c(w_k + c_u u) \qquad \text{Eq. (3.5)}$$

We can define a cumulative forcing term $v_k$ where $$v_k = w_k + c_u u \qquad \text{Eq. (3.6)}$$

Substituting Eq. (3.6) into Eq. (3.5) gives $$e_k = cv_k \qquad \text{Eq. (3.7)}$$

Again assuming that the disturbance u and influence coefficients c and $c_u$ do not change over one control iteration, we can use Eq. (3.7) and rearrange Eq. (3.6) for both control iterations k and k+1 in Eq. (3.3) giving relationship:

$$v_{k+1} = v_k - \alpha \frac{c}{\hat{c}} v_k \qquad \text{Eq. (3.8)}$$

$$v_{k+1} = \left(1 - \alpha \frac{c}{\hat{c}}\right) v_k \qquad \text{Eq. (3.9)}$$

The recursive forcing of Eq. (3.9), combined with Eq. (3.7) yields the controlled vibration error history $$e_{k+1} = \left(1 - \alpha \frac{c}{\hat{c}}\right)^{k+1} e_0 \qquad \text{Eq. (3.10)}$$

It then follows that the single-plane active balancing control is stable for constant influence coefficients c if and only if $$R = \left|1 - \alpha \frac{c}{\hat{c}}\right| < 1 \qquad \text{Eq. (3.11)}$$

This criterion can be represented graphically in the complex plane as shown in FIG. 3.2.

From FIG. 3.2, one can see how the control gain parameter α can enhance robustness. For the case in which the actual influence coefficient does not change during control convergence, it can be shown, based on Eq. (3.11), that the non-adaptive control law of Eq. (3.3) is stable if and only if $$\alpha < 2 \frac{|\hat{c}|}{|c|} \cos(\theta_c - \theta_{\hat{c}}) \qquad \text{Eq. (3.12)}$$

where $|c|$ and $|\hat{c}|$ are the magnitudes of the actual and the estimated influence coefficients and $\theta_c$ and $\theta_{\hat{c}}$ are their respective phase angles. Since α is defined to be greater than zero, if the phase angle of the influence coefficient estimate lies between ±90° (noninclusive) of the actual influence coefficient phase angle (i.e., the real part of the quotient c/ĉ is greater than zero), then there exists a gain α for which the control is stable.

The convergence of the controlled error from the initial state $e_0$ to zero is governed by Eq. (3.10). It is clear that although small values for a enhance stability robustness, they also slow down control convergence rate. It is also clear that an accurate estimate of the influence coefficient reduces the necessity to be conservative in choosing the gain α for stability robustness reasons. Therefore an on-line estimation strategy can be employed to ensure accurate influence coefficient estimates regardless of changing or nonlinear dynamics.

On-Line Estimation of Influence Coefficient

If the balance correction state is measurable, plant input and output information is available with which to estimate the influence coefficient after each control iteration. The proposed approach for accomplishing the estimation is a recursive exponentially weighted averaging method. This method is based on using the current and most recent previous measurements to calculate the instantaneous value of the influence coefficient using the following formula:

$$c_{new} = \frac{e_k - e_{k-1}}{w_k - w_{k-1}} \qquad \text{Eq. (3.13)}$$

Previous researchers have utilized non-recursive and recursive least-squares estimation using data from every control iteration in past history. This has the effect of estimating the average influence coefficient over time without responding well to time-varying dynamics. Other work used the initially measured input and output along with the current measurements compared to the current and most recent previous measurements used for this work. In the former estimation technique, if the plant dynamics or unbalance disturbance change, or are nonlinear, this method may lead to control instability or, at the very least, slower control convergence. Furthermore, no provision is made to mitigate the effects of measurement noise.

Assuming sufficient excitation (i.e., sufficient change in the control input $w_k$ from iteration to iteration), the computed value $c_{new}$ will be non-singular. (A supervisory method will be discussed later that "turns off" estimation and control in certain situations where insufficient excitation persists). However, this estimation formula is also directly subject to the noise present in measuring e and w. Therefore, it may not be desirable to throw out all previously estimated information of the influence coefficient. To mitigate the effect of measurement noise, an exponentially weighted recursive average can be used to update the influence coefficient. The updated influence coefficient used in computing the next control step is then estimated as $$\hat{c}_k = (1 - \beta)\hat{c}_{k-1} + \beta\left(\frac{e_k - e_{k-1}}{w_k - w_{k-1}}\right) \qquad \text{Eq. (3.14)}$$

Where $0 \leq \beta \leq 1$. The "β" parameter is a "forgetting factor" that governs the extent of control system adaptivity. When the value of "β"=0, no weight is given to the newly calculated influence coefficient and the control system is the same as the non-adaptive system discussed previously. When the value of "β" is close to one, the adaptive controller places more weight on the most recently estimated influence coefficient and tends to ignore previous estimates.

The forgetting factor β can be chosen to provide an optimum trade-off between estimation sensitivity to measurement noise, and speed of estimation convergence. For the stationary case after the estimation has substantially converged, the statistical variance of the exponentially weighted influence coefficient estimate can be defined as a function of the variance of $c_{new}$. Assuming that the new measurement is independent of the past estimate, the variance of the estimate is given by:

$$\text{Var}[\hat{c}_k] = \left(\frac{\beta}{2-\beta}\right)\text{Var}[c_{new}] \qquad \text{Eq. (3.15)}$$

Thus, the estimation variance can be reduced by selecting a low value for β. For values of β close to unity, the estimation variance approaches the variance of the calculated parameter $c_{new}$. This relationship is shown in FIG. 3.3.

The estimation will "track" the actual influence coefficient c as it varies over time. The disadvantage of choosing a low forgetting factor β is that estimation convergence rate is reduced. For the case of a step change in the actual influence coefficient to a new constant value, the influence estimation convergence is governed by the equation $$E[\hat{c}_k] = c + (\hat{c}_0 - c)(1-\beta)^k \qquad \text{Eq. (3.16)}$$

where c is the actual influence coefficient, $\hat{c}_0$ is the initial estimate and $E[\hat{c}_k]$ is the expected value of the influence coefficient estimate after k iterations. The number of estimation iteration required for 95% convergence of the estimate for varying β values is plotted in FIG. 3.3.

Higher β results in faster estimation convergence. For systems that have slowly varying dynamics and high measurement noise, a low β value is best. For highly nonlinear or rapidly varying dynamic systems, a larger β value would be necessary for fast control convergence.

Recursive Supervisory Adaptive Control Law

With the addition of the control gain α and the on-line influence coefficient estimation, the adaptive single plane recursive control law is given by $$w_{k+1} = w_k - \alpha\left(\frac{e_k}{\hat{c}_k}\right) \qquad \text{Eq. (3.16)}$$

where $\hat{c}_k$ is given in Eq. (3.14). The block diagram form of the controller is shown in the Figure below.

When the magnitude of the change in balance correction vector $|w_k - w_{k-1}|$ approaches zero, the estimation of $\hat{c}_k$ becomes singular. This could lead to "bursts" of spurious estimates and the balance weights being commanded to non-ideal positions. Though the estimation and control would likely re-converge after a brief "burst" of high vibration, such an event is undesirable and could lead temporarily to harmful vibration levels. Applicant utilizes a rule-based supervisory strategy.

The supervisory strategy used for these experiments was to "turn off" the estimation whenever the change in control vectors $w_k - w_{k-1}$ fell below some predetermined low level. This level was chosen base on the balance correction resolution and measurement noise of the balance correction vector. The control was deactivated whenever the vibration error level fell below a preset limit. When deactivated, the controller could continue to monitor the vibration error and reactivate the control and estimation when the error exceeded a certain limit. The limit level included some "hysteresis" to prevent annoying on-off cycles of the controller. Thus, the vibration error limit at which the controller. Thus, the vibration error limit at which the controller turned back on was somewhat higher than the limit at which the controller turned off. A flow chart of this supervisory strategy is shown in FIG. 3.5.

Such a supervisory control strategy is important for machine tool applications as active balance corrections should only be performed prior to, not during, metal cutting. The balancing system was configured so that it could receive an "activate" command, and after successful control of vibration error below the limit level, would deactivate itself. Vibration error, would be monitored continuously for history logging purposes.

Single Plane Adaptive Control Experimental Results
Experimental System Configuration The adaptive control law derived above in Eq. (3.17) was implemented for a high-speed machining spindle active balancing system. The system was tested on two different spindles with similar results. Test spindle 1 was a 23,700 rpm, 1 kW air-cooled spindle. Test spindle 2 was a 15,000 rpm, 75 kW liquid-cooled spindle.

A Hall Effect sensor detected a fixed magnetic target on the rotating shaft to compute spindle rotational speed and to act as a phase reference. The synchronous vibration error phasor was computed each control iteration as discussed previously. Thirty-two (32) samples of spindle housing radial vibration (measured with a piezoelectric accelerometer) were obtained every spindle revolution with sampling synchronized to spindle rotation. Data from multiple spindle revolutions (typically six) were then time-synchronous averaged to provide additional filtering of noise and non-synchronous components.

Balance correction was measured by detecting the passing of a magnet target on each balance rotor by stationary Hall Effect sensors. The phase lag of these events compared to the shaft phase reference target was calculated to determine the angular location of each balance rotor.

Results of Control Nonlinear "Hardening" System

Results of the single-plane active balancing tests showed the efficacy of the adaptive control approach. Test spindle 1 was used to test the adaptive control system robustness in the presence of nonlinear dynamics. The spindle exhibited a "hardening" stiffness effect when vibrating at large amplitudes. At the test rotational speed, the spindle dynamic stiffness was about two times greater at high unbalance levels than at low unbalance levels. For example, on unit of unbalance would cause on unit of vibration, but two units of unbalance would result in only about 1.5 units of vibration. A non-adaptive linear influence coefficient based control algorithm generally may have difficulty quickly achieving low vibration in the presence of such a harsh nonlinearity. Control stability may also be in question depending on the initial conditions. For the test described here, an initial estimate of the influence coefficient magnitude and phase in the range of previously measured varying values was supplied to the controller. FIG. 3.7 shows how the measured spindle housing vibration at the operating speed 10,000 rpm was reduced to an acceptable level by the adaptive controller.

FIG. 3.7 shows that vibration was controlled to below the low limit in two balance correction iterations the time required for the vibration data sampling, estimation, and control computation is evident by noting the time between the end of the first balance iteration and the start of the second (observable when the vibration again begins to decrease again just before one second). A portion of this time between balance weight positioning was allotted as a fixed delay to allow the transient vibration to settle.

An interesting and surprising side benefit of actively balancing the "hardening" nonlinear system was the broad frequency band effectiveness of the synchronous vibration control. Since the available forcing of the active balancing system can only occur synchronous to the machine rotation, active balancing in general can only control synchronous vibration. However, for nonlinear systems, large unbalances can excite nonlinear effects that appear at higher harmonic frequencies. Therefore, by controlling synchronous vibration, these broadband vibrations can also be significantly diminished. This previously unanticipated result is shown in FIG. 3.8, a time frequency graph of vibration during a single-plane active balancing test. Note that the rotor-synchronous component is the dominant frequency component of vibration. Other integer and half-integer vibration harmonies also appear prior to active balancing.

After active balancing was completed the synchronous vibration component was dramatically reduced. Furthermore, the higher harmonies were also eliminated due to the reduction of the synchronous component and the subsequent nonlinear effects.

Tests of Control With Time-Varying Dynamics

Another important test of the adaptive control system is its robustness to changes in plant dynamics. As described previously, rotating machine dynamics can vary over time due to changing operating environment, degradation or damage of components, or various other reasons. This tendency for rotordynamics to change appreciably highlights the need for a robust adaptive control strategy.

In the case of high-speed machining spindles, different tool inertias and varying machine configurations can result in significant variation of the system dynamics. The most typical scenario for time-varying dynamics on a machine tool would be an abrupt step change in both machine dynamics and unbalance disturbance after a tool change. Thus, the "time-varying" characteristic is that the dynamics are unknown and the influence coefficient estimate is inaccurate at the beginning of the next active balancing cycle. The performance of the single-plane adaptive active balancing system was tested for the worst case scenario by providing the control system with an enormous initial estimate of the system influence coefficient. The results of the test with the spindle operating about 10,00 rpm are shown in FIG. 3.9.

It is evident that the erroneous initial influence coefficient estimate caused the controller to move the balance weights in the "wrong" direction, causing undesired temporary increase in vibration which could have permanently harmed the tool assembly. After each control iteration, however, new input-output data was utilized in a weighted average to re-estimate the system unbalance response vector. After four control iterations and less than three seconds, the active balancing system controlled vibration to below the preset low limit. The controller then had acquired, or "learned", the spindle dynamic response at that operating speed during the exercising of control. Thus, the active balancing system can be used as a probe to measure and track the inherent dynamic response of a system. Such data contains useful diagnostic information such as and without limitation data associated with the dynamic bearing stiffness and effective rotating inertia.

If balancing were again required for the same operating speed and machine configuration the control system would be able to reject new disturbances much more quickly. Results of a test of the active balancing system after such adaptive "learning" are shown in FIG. 3.10.

The test results shown in FIG. 3.10 indicate how quickly the single-plane control system can respond when an accurate estimate of the influence coefficient vector is available.

Results of Control at Multiple Rotational Speeds

A test of the active balancing system on test spindle 2 resulted in significantly decreased vibration at all speeds. The spindle was run at various constant speeds from 5,000 rpm up to its maximum operating speed of 15,000 rpm and active balancing at each speed and is shown in FIG. 3.11.

The spindle manufacturer considered 2 mm/sec to be acceptable but less than 1 mm/sec vibration desirable to protect spindle bearing life.

During this experiment, the adaptive active balancing system reduced synchronous vibration by 79-99%. The control system was able to maintain synchronous vibration at or below 0.5 mm/sec even when initial vibration well exceeded acceptable levels. Background vibration "noise" and the positioning resolution of the balance mass actuators determined the minimum achievable controlled vibration level.

The balance correction states providing minimal synchronous vibration at each speed during the tests are shown in FIG. 3.12.

The amount the balance correction magnitude and phase had to change over the speed range is a measure of how "upstream", or co-located, the vibration control was. If the optimal balance correction remained the same over the entire speed range, we would know that the balance correction was exciting the same vibrational modes as the disturbance unbalance. In this case the control input would be entering the system in the same way as the disturbance and the control could be considered to be eliminating the source of harmful vibration. If the balance correction were required to change significantly over the speed range it would be evidence of more "downstream" or non-colocated control. That is, the control would be exciting different vibrational modes than the disturbance unbalance. The control, therefore, could only eliminate the effect of the disturbance at the sensor, not the disturbance itself. In the case that balance correction plane is non-colocated with the disturbance, or the unbalance disturbance is distributed in many planes, multiple-plane balancing may be in order. Multiple-plane balancing is more capable of "upstream" control than single plane balancing because more vibrational modes are potentially excited. In the experiments shown above the optimal balance correction magnitude and phase only changed slightly above 9,000 rpm. At 7,000 rpm, however, balance correction state was significantly different than at other speeds. These results indicate that single plane balancing would likely be sufficient at 9,000 rpm and above. At 7,000 rpm, results indicate that single plane balancing would likely be sufficient at 9,000 rpm and above. At 7,000 rpm, additional modes are excited by the residual unbalance disturbance which may require multiple plane balancing to control.

A significantly useful side benefit of the active balancing system is that it can be used as a probe to measure and track the unbalance response of a system. Such system identification information contains useful data about the dynamic bearing stiffness and effective rotating mass. For the experiment discussed above, the unbalance sensitivity was stored at each speed every time the active balancing system was enabled to control vibration. This data was obtained for two spindle system configurations to allow for comparisons. A long tool and short tool were separately inserted into the spindle and active balancing control enabled for successive rotational speeds. FIG. 3.13 and FIG. 3.14 below show the measured unbalance sensitivity amplitude and phase angle for the two tool configurations.

These data were obtained by activating the automatic balancing system at each speed and storing the last influence coefficient estimate used during active balancing. Thus the unbalance response shown also indicates the control authority magnitude of the active balancing system on spindle vibration.

These last tests were conducted with the spindle mounted on a massive test bench. Since the tool mass was considerable less than the overall vibrating system mass, the unbalance response did not change dramatically when the different tools were inserted. One can observe in FIG. 3.12 that, as one might expect, the critical speed close to 11,000 rpm did shift to a slightly higher frequency with the smaller tool inserted. The peak response also decreased slightly.

Stability of Adaptive Influence Coefficient Control

The single plane adaptive influence coefficient recursive control law was earlier derived. The controller 10 commands the balance correction at control iteration k+1 to the state given in Eq. (3.17) by the use of "$\alpha$" and "$\beta$" control parameters. The manner in which this is accomplished is further shown below.

For the case in which the actual plant influence coefficient and the disturbance remain constant during control convergence, the overall adaptively controlled error response can be derived. Such a scenario is representative of the typical machine tool active balancing application. After each tool change, balancing is performed at the new operating speed at which cutting is to be performed. The relevant dynamics can, in general, be expected to vary significantly from tool change to tool change because of different spindle operating speeds, toolholder inertias, and geometric configurations of the machine structure. However once the spindle is accelerated to the new operating speed, the unbalance disturbance and machine dynamics do not typically change during the few seconds in which active balancing is performed.

The adaptively controlled vibration error response can be formulated using the control and estimation equations previously derived. This formulation is based on the assumptions that the actual influence coefficient c and unbalance disturbance d do not change during control convergence, and that "sufficient excitation" exists to allow non-singular estimation at each control iteration. When the control has converged well enough that the balance correction is no longer changing, the estimation must be "turned off". After such convergence the active balancing control response will be the same as non-adaptive control method. To analyze the control response during convergence, we can substitute the expected value of the influence coefficient estimate from Eq. (3.16) into the control of law Eq. (3.17). The adaptively controlled vibration error response is then given by the recursive relationship $$e_{k+1} = \left(1 - \frac{\alpha c}{c + (\hat{c}_0 - c)(1-\beta)^k}\right) e_k \quad \text{Eq. (4.1)}$$

The adaptively controlled vibration error can then be described by the infinite product $$e_{k+1} = e_0 \prod_{j=0}^{k} \left(1 - \frac{\alpha c}{c + (\hat{c}_0 - c)(1-\beta)^j}\right) \quad \text{Eq. (4.2)}$$

Recall that the estimation forgetting factors defined such that $0 < \beta \leq 1$. Therefore, regardless of the initial influence estimate $\hat{c}_0$, the argument of the infinite product of Eq. (4.2) converges (again assuming sufficient excitation) in the limit such that:

$$\lim_{j \to \infty} \left(1 - \frac{\alpha c}{c + (\hat{c}_0 - c)(1-\beta)^j}\right) = 1 - \alpha \quad \text{Eq. (4.3)}$$

Because the control gain $\alpha$ is defined such that $0 < \alpha \leq 1$, there will exist a control iteration p ($p < \infty$) such that when j=p the magnitude of the argument will be less than one. Although the infinite product argument magnitude will eventually fall below one and thereafter cause the product to converge, the value of $e_k$ may continue to increase until the $p^{th}$ iteration. The corresponding vibration error $e_p$ will reach the value $$e_p = e_0 \prod_{j=0}^{p-1} \left(1 - \frac{\alpha c}{c + (\hat{c}_0 - c)(1-\beta)^j}\right) \quad \text{Eq. (4.4)}$$

After the $p^{th}$ iteration, the error magnitude will begin to decrease. Thus the magnitude of the error at the $p^{th}$ iteration depends on the magnitude of the estimation error ($\hat{c}_0 - c$) and the value of $\beta$. An example of this is shown in FIG. 4.1.

Note that the error magnitude in FIG. 4.1 continues to increase until the infinite product argument falls below one at the third control iteration. In this case the iteration p=3 and the maximum worst case error magnitude is computed from Eq. (4.4) to be $|e_p|$=7.31.

Because it occurs before the infinite product argument converges to $1\alpha\alpha$, the value p will always be finite. Therefore, the maximum controlled error must be bounded. For any arbitrary finite value $e_p$ and any complex term a such that $|\alpha| < 1$, the infinite product shown in Eq. (4.5) will exponentially converge to zero as k→∞.

$$e_{k+1} = e_p \prod_{j=p}^{k} \alpha \quad \text{Eq. (4.5)}$$

The significance of this result is that, assuming sufficient excitation and that the plant influence coefficient and disturbance remain constant during control convergence, the infinite product of Eq. (4.2), and hence the adaptive control law of Eq. (3.17) is stable regardless of the initial influence coefficient estimate.

The stability analysis above is based on the assumption that neither the unbalance disturbance nor the machine dynamics changed during control convergence. However, it is reasonable to extend the stability conclusion to certain cases of time-varying disturbances and influence coefficients. Simplistically speaking, after initial convergence, the on-line estimation would "track" changes in the machine dynamics with exponential convergence as long as the influence coefficient varied less than $2\beta$ times the previous influence coefficient each control iteration. This is because the estimation will respond a fraction $\beta$ times the distance to the actual value during each iteration. Similarly, if the unbalance disturbance changes less than $2\alpha$ times the previous value during each iteration, the control would still exhibit exponential convergence because the control would get closer to the optimal value each iteration. These comments are somewhat simplistic, however, because they neglect the more complicated issue of the combined effect on estimation of disturbances and influence coefficients that change from iteration to iteration. However, the statements do provide a general idea of what rates of change the disturbance and dynamics will still allow stable control.

The only caveat in the stability condition proven above is that there is no way of telling how high the error signal gets before it begins to converge to zero. Choosing $\alpha = \beta = 1$ will cause faster adaptation and control convergence. However, the higher the value of $\alpha$, the worse the temporary vibration error will become during control convergence. Thus, although the control system is stable an erroneous initial influence coefficient estimate will always present a trade-off between speed of control convergence, and the amount of temporarily high vibration "overshoot".

Parameter Auto-Tuning Adaptive Control

If one were able to vary the adaptive parameters $\alpha$ and $\beta$ from control iteration to control iteration, one might be able to eliminate the trade-off between control convergence rate and the worst case temporary vibration. Such a parameter "auto-tuning" method would, therefore, allow the best of both worlds during control convergence. When the influence estimate was accurate (i.e. the infinite product argument in Eq. (4.2) was close to the value of 1−α) a value of α close to one would provide the most rapid control convergence. When the influence estimate was not accurate, a low value of α would provide more cautious control and thereby limit the worst case vibration error "overshoot". A method of automatically selecting the parameters α and β according to this concept is hereafter described.

Since the actual influence coefficient during control is unknown, it is, unfortunately, impossible to know how accurate the influence estimate is. It is, however, possible to measure the convergence of the influence estimate. One could accomplish this by for estimation scheme discussed here by comparing the difference between the instantaneously measured influence coefficient, and the exponentially weighted averaged estimate. A parameter $\epsilon_k$ can be defined as a normalized measure of influence coefficient estimation convergence error at iteration k such that $$\varepsilon_k = \sqrt{\frac{(c_{new} - \hat{c}_{k-1}) * (c_{new} - \hat{c}_{k-1})}{\hat{c}^*_{k-1}\hat{c}_{k-1}}} \qquad \text{Eq. (4.6)}$$

where $c_{new}$ and $\hat{c}_{k-1}$ are defined in Eq. (3.13) and Eq. (3.14) respectively. The symbol "*" represents the complex-conjugate. Assuming that the actual influence coefficient and unbalance disturbance did not change, this estimation convergence error measure will be unbiased. The parameter $\epsilon_k$ will eventually converge to zero as the influence estimate converges according to Eq. (3.16) and will be calculated by controller 22 for each control iteration.

To implement the automatic adjustment of parameters α and β during each control iteration, the following functions are proposed.

$$\alpha_k = 1 - e^{(-1/\eta_\alpha \epsilon_k)} \qquad \text{Eq. (4.7)}$$

$$\beta_k = e^{(-1/\eta_\beta \epsilon_k)} \qquad \text{Eq. (4.8)}$$

where $\alpha_k$ and $\beta_k$ are the control gain and estimation forgetting factors respectively to be used at each control iteration k by the controller 22 and where $\eta_\alpha$ and $\eta_\beta$ are arbitrary real scaling factors to allow flexibility in shaping the response of each parameter. Eq. (4.7) and Eq. (4.8) ensure that when the influence estimation error is high, the control gain $\alpha_k$ is low. Examples of acceptable scaling factors include the value of 1 for each factor. This will tend to limit and/or substantially reduce the worst case transitory vibration error. As shown in FIG. 4.2 when the estimation error is low, the control gain $\alpha_k$ approaches one, ensuring fast control convergence. Conversely, the estimation weighting parameter $\beta_k$ is close to unity when estimation error is high, ensuring fast estimation response. $\beta_k$ is close to unity when estimation error is high, ensuring fast estimation response. $\beta_k$ is low when the estimation is more accurate, reducing the effect of measurement noise.

Note that if estimation error was ever exactly zero, the exponents in Eq. (4.7) and Eq. (4.8) would both become singular. The exponential, however, would approach zero in this case. For the practical implementation of the method, a very small positive number can be added to the denominator in the exponents during computation to ensure numerical robustness.

Using the function for $\beta_k$ given in Eq. (4.8), the auto-tuning estimation equation is given by $$\hat{c}_k = (1-\beta)\hat{c}_{k-1} + \beta_k \left(\frac{e_k - e_{k-1}}{w_k - w_{k-1}}\right) \qquad \text{Eq. (4.9)}$$

The auto-tuning adaptive control law is subsequently $$w_{k+1} = w_k - \alpha_k \frac{e_k}{\hat{c}_k} \qquad \text{Eq. (4.10)}$$

where $\alpha_k$ is given by Eq. (4.7) and $\hat{c}_k$ is computed from Eq. (4.9) and where the applied balance "$w_{k+1}$" relates to and/or comprises the movement of the rotors 28, 30 to a position defined by the value of "$w_{k+1}$" (e.g. a position providing the level or amount of unbalance correction represented by the value of "$w_{k+1}$").

Automatic Supervisory Limit Selection

A supervisory control strategy is necessary for many machine tool applications because active balance corrections should only be performed prior to, not during, metal cutting. The balancing system should be configured so that it could receive an "activate" command and, after successful balancing, would deactivate itself and signal the machine controller to begin machining. If the balancing system were not deactivated, the nonstationary synchronous vibration signal likely to be present during machining could lead to the active balancing device constantly "hunting" to find the optimal balance correction. Balance adjustments based on the vibration during cutting could potentially cause an increase in unbalance and harmful vibration. Furthermore, such continuous operation requires more power to the balance actuators and could lead to undo wear and tear on the device. To alleviate these problems, a supervisory strategy is in order to prevent excessive balance adjustments and estimation bursting.

A practical consideration for end users of such an active balancing system is how to set the vibration error limits to activate and deactivate control appropriately. One would want to set them as low as possible to ensure that low vibration levels were achieved. However, measurement noise, variation in machine dynamics and resolution limitations of the active balancing device constrain just how low the vibration error can be controlled. Because of these issues, some specialized engineering knowledge must be applied in selecting supervisory limit vales. Such specialized knowledge is not always available to the typical end-user of the active balancing system. Furthermore, when machine speed or setup changes, the limit levels would require re-adjustment. Therefore, an automated method of selecting control limits is proposed here that incorporates the considerations mentioned above.

For active balancing devices with discrete states such as the one used for this research, the worst case correction resolution can be defined. This resolution, in combination with the estimate of the system influence coefficient, can be used to define the low vibration error limit at which control will "deactivate". This limit can be defined as $$e_{low_k} = |\hat{c}_k| w_{res} e^{-\eta_e \epsilon_k} \qquad \text{Eq. (4.11)}$$

where $\hat{c}_k$ is the estimated influence coefficient a the current control iteration k, $w_{res}$ is the worst case balance correction resolution (in the same unbalance units used in the influence coefficient), $\eta_e$ is a unit-less scaling factor (simply for added flexibility in shaping response) and $\epsilon_k$ is the influence coefficient estimation error defined in Eq. (4.6). The exponential term is included to ensure that the control does not prematurely deactivate because of an erroneous influence coefficient estimate. When the influence coefficient estimation is converged ($\epsilon_k$ is small) the low control limit will be the vibration error expected at the worst case resolution.

Using single activation-deactivation vibration limit may result in spurious control activation if random noise causes the measured vibration error to jump back above the limit. To prevent this, an additional "high" limit can be defined to incorporate a hysteresis band into the supervisory control. Thus once the control is deactivated when the vibration falls below the low limit, it is not reactivated unless the vibration exceeds a higher limit as shown in FIG. 4.3.

For the automated limit selection method used here, after controlling vibration error to below the "low" limit of Eq. (4.11), control will not be reactivated until vibration error magnitude exceeds a "high" limit defined as $$e_{high_k} = 3\sigma_e + e_{low_k} \qquad \text{Eq. (4.12)}$$

where $\sigma_e$ is the standard deviation of the vibration error magnitude measurement. This standard deviation could be continuously measured whenever the control system was deactivated and simply monitoring the idling spindle vibration error.

The low limit of Eq. (4.11) was chosen so that, in the worst case, the mean value of vibration error magnitude will be exactly at the low limit. In the most cases, the mean error magnitude will be less than the low limit. The measured error magnitude will fluctuate about the mean value because of measurement noise. Assuming that the measurement noise is Gaussian, even in the worst case when the error magnitude mean were stationary at the low limit, there would be a 99.7% probability that the measured error magnitude would not exceed the high limit of Eq. (4.12). therefore, by automatically defining the high limit this way, there is a high probability that control would not be spuriously reactivated purely because of measurement noise.

By using Eq. (4.11) and Eq. (4.12) to automatically select supervisory control limits, no specialized user knowledge or user input is required. Furthermore, these automatic selection criteria take into account specific plant dynamics, active balance correction resolution and vibration error measurement noise.

Experimental Results

An active balancing device was mounted on a conventional and commercially available high-speed grinding spindle and the auto-tuning adaptive control tested for various cases of unknown step changes in the unbalance disturbance and influence coefficient.

Particularly, the test spindle was a Fischer Model No. MFW-1240 grease-lubricated liquid cooled 10 kW high-speed grinding spindle. This would be a typical state-of-the-art spindle for CBN grinding applications. The spindle allowed for safe testing at the relatively high rotational speed of 20,000 rpm.

Auto-Tuning Control Performance Compared with Typical Fixed-Parameter Control with Erroneous Influence Coefficient Estimate Tests were performed to compare the auto-tuning control with the conventional fixed-parameter adaptive control developed. FIG. 4.5 shows the comparative results for the condition of an erroneous initial estimate of the influence coefficient. The initial influence estimate used was approximately 180° out of phase with the actual influence coefficient. The conventional fixed adaptive parameters were set to typical values of $\alpha=0.9$ and $\beta=0.08$.

Note that the erroneous initial influence coefficient estimate causes both controllers to temporarily increase the vibration error magnitude. However, the auto-tuning controller allows a much lower worst error magnitude while converging as fast, or even faster than the conventional adaptive controller. The corresponding filtered synchronous vibration error values and adaptive parameter values are shown in FIG. 4.6.

Comparison with "Cautious" Fixed-Parameter Control with Erroneous Influence Coefficient Estimate To limit the worst case error magnitude to that of the auto-tuning controller, the conventional controller must use an initial control gain of $\alpha=0.1$. Since the parameter remains constant during conventional control convergence, however, significantly reduced speed of control convergence results. FIG. 4.7 shows the results of such a "cautious" conventional adaptive control approach compared again to the auto-tuning controller performance.

The corresponding filtered synchronous vibration error values are shown in FIG. 4.8. Setting the control gain to a low value allowed the conventional adaptive control to limit the worst case overshoot vibration error. However, the convergence rate was significantly slowed.

Comparative Performance with Typical Fixed-Parameter Control with Accurate Influence Coefficient Estimate When the initial estimate is accurate, conventional adaptive influence coefficient control performance is typically very good. The worst case error is very low and control convergence is rapid. FIG. 4.9 shows the comparative performance of the auto-tuning and conventional adaptive control when an accurate influence estimate is available.

FIG. 4.10 shows the corresponding filtered synchronous vibration error values and adaptive parameters during the control convergence.

In the case of an accurate influence estimate, the auto-tuning control performs just as well as the conventional adaptive control. In fact the only situation in which the auto-tuning control will not perform at least as well as the conventional control is when the conventional control can converge in one step. Since a low initial value of control gain $\alpha_k$ is used in the auto-tuning control, the control will never converge in only one step. It would often be able to converge in two steps in the same conditions, however.

Summary of Experimental Auto-Tuned Adaptive Control Performance

The adaptive parameter auto-tuning functions introduced above enhance conventional adaptive influence control by limiting the worst case temporary vibration error while allowing the same (or better) control convergence rate. Furthermore, because parameters are varied automatically during each control iteration, no user setup is required. This is typically a distinct advantage because no special operator training is required to setup and use the vibration control system for each individual machine or environmental condition.

Automatic Supervisory Limit Calculation Experimental Results

The automatic supervisory limit selection method was enabled during the experimental testing. FIG. 4.11 shows the automatically calculated supervisory limit settings from the experiment shown in FIG. 4.6.

Control was deactivated once vibration error magnitude was controlled below the low limit at about 1.0 seconds elapsed time. Control was never reactivated because vibration error magnitude never exceeded the high limit. The standard deviation of the vibration error magnitude measurement noise during this test was 0.0029 g's. The active balancing device used in the test had two stepper-motor type balance rotors each with 60 detent increments per revolution. The worst case balance correction resolution for this configuration is $\pi/n_{detents}$ (i.e., 5.2%) of the maximum balance correction capacity of the device.

In summary, the previous description shows that Applicant's invention substantially eliminates performance trade-offs inherent in the fixed-parameter adaptive control and automatically incorporates engineering knowledge to simplify the active balancing system operation for the end-user.

The adaptive influence coefficient method allows active balancing control without a priori modeling or experimentation to determine plant dynamics. A stability analysis was presented for the fixed-parameter adaptive control in the typical case where the synchronous disturbance and plant influence coefficient control was shown to be stable in these cases regardless of the initial influence coefficient estimate. However, the worst case temporary vibration during control adaptation could become quite large for erroneous influence coefficient estimates. A trade-off exists between speed of control convergence and the magnitude of this worst case error.

An automatic tuning method was therefore presented that allows the adaptive control parameters to be adjusted each control iteration to limit the low worst case error magnitude while still providing fast control convergence. The parameters were adjusted each control iteration based on an instantaneous measure of the influence coefficient estimation accuracy. When estimation was inaccurate, the control become less aggressive and the estimation placed more weight on the instantaneously measured influence coefficient. When estimation error was low, the adaptive parameters were adjusted to provide more aggressive control and to place more weight on the long-term averaged estimation.

Supervisory control is necessary to "turn off" control so that machining operations can proceed once vibration is controlled below an acceptable limit. Significant specialized engineering knowledge is typically required to set supervisory vibration error limits for each application. Automatic supervisory limit selection criteria were defined to eliminate the need for such specialized end user input. The vibration error limits for enabling and disabling control were defined based on functions of estimate of machine dynamics, estimation accuracy, active balance mass actuator resolution and vibration measurement noise.

Experimental results showed that the "auto-tuned" controller provided control response speed comparable to, or better than, the conventional adaptive control while maintaining significantly lower the worst case vibration error magnitudes. The experiments also illustrated the effectiveness of the auto-tuning supervisory control with integrated automatic error limit calculation. The multiple plane dithering aspect of Applicant's invention will now be described.

Derivation of Optimal Control Law

The multiple-plane influence matrix-based active balancing control law was previously discussed. For square influence matrices [C], the control law is again presented here with the estimated influence matrix $[\hat{C}]$ used instead of the actual influence matrix, which is not necessarily known.

$$\{W\}_{k+1} = \{W\}_k - [\hat{C}]^{-1}\{E\}_k \qquad \text{Eq. (5.1)}$$

For the case of more error sensors than balance planes, the influence matrix is not square. Because the influence matrix does not exist in this case, the control law of Eq. (5.1) cannot be used. Active balancing, therefore, cannot in general drive all the error signals to zero. Researchers involved in off-line balancing have noted that least squares solution (or "pseudo-inverse") of influence coefficient balancing can be implemented for non-square influence matrices. Such a control scheme allows the minimization of the sum of the squares of error signal residuals. In the event that not every error sensor output were deemed as important as every other, a weighted least squares control law can be implemented. A real positive semi-definite n×n (where n is the number of error sensors) diagonal penalty matrix [Q] can be specified to give the desired relative weighting of the error sensors:

$$[Q] = \begin{bmatrix} q_1 & & & 0 \\ & q_2 & & \\ & & \ddots & \\ 0 & & & q_n \end{bmatrix} \qquad \text{Eq. (5.2)}$$

where $q_i$ is the relative weight of the $i^{th}$ error sensor. Similar real positive semi-definite m×m (where m is the number of active balance planes) weighting matrices [R] and [S] can be defined to penalize control effort, and control rate of change respectively. An objective function $J(\{E\}_{k+1}, \{W\}_{k+1}, \{W\}_k, [Q], [R], [S])$ can then be defined such that $$J = \frac{1}{2}\{E\}_{k+1}^*[Q]\{E\}_{k+1} + \frac{1}{2}\{W\}_{k+1}^*[R]\{W\}_{k+1} + \qquad \text{Eq. (5.3)}$$
$$\frac{1}{2}(\{W\}_{k+1} - \{W\}_k)^*[S](\{W\}_{k+1} - \{W\}_k)$$

Where the "*" symbol denotes the complex-conjugate transpose operator. The optimal control problem then consists of commanding the balance weight vector for the next control iteration $\{W\}_{k+1}$ so as to minimize the objective function J.

Assuming that the disturbance vector {D} does not change over one control iteration, the error vector relationship of Eq. (2.5) can be applied for two control iterations and the results combined to yield the relationship $$\{E\}_{k+1} = [C](\{W\}_{k+1} - \{W\}_k) + \{E\}_k \qquad \text{Eq. (5.4)}$$

Substituting Eq. (5.4) into Eq. (5.3) allows evaluation of the objective function J using only the updated control vector $\{W\}_{k+1}$ and measured values $\{E\}_k$ and $\{W\}_k$:

$$J = \frac{1}{2}([C](\{W\}_{k+1} - \{W\}_k) + \{E\}_k)^*[Q]([C](\{W\}_{k+1} - \{W\}_k) + \qquad \text{Eq. (5.5)}$$
$$\{E\}_k) + \frac{1}{2}\{W\}_{k+1}^*[R]\{W\}_{k+1} +$$
$$\frac{1}{2}(\{W\}_{k+1} - \{W\}_k)^*[S](\{W\}_{k+1} - \{W\}_k)$$

To find the stationary points of the objective function J with respect to the updated control vector $\{W\}_{k+1}$, we can take the corresponding partial derivative, set it equal to zero and solve for the control vector. This stationary point is guaranteed to be a minimum if the objective function J is truly a quadratic function of $\{W\}_{k+1}$. To ensure that J is a quadratic function, at least one of the matrices [Q], [R], and [S] must be positive definite. Furthermore, if only [Q] is positive-definite, then the matrix [C] must also be full rank (rank m in this case). To ensure that the influence matrix [C] is full rank, care must be taken to install the active balancing devices in appropriate planes. These are: 1) avoid placing them at nodal locations of any vibrational modes to be controlled; and 2) make sure that the influences from each balance plane on the error vector are independent for all speeds at which the active system will be operated.

Using matrix calculus techniques, the equation for minimal objective function is found to be $$\frac{\partial J}{\partial \{W\}_{k+1}} = 0 = [C]^*[Q]([C](\{W\}_{k+1} - \{W\}_k) + \{E\}_k) + [R]\{W\}_{k+1} + [S](\{W\}_{k+1} - \{W\}_k) \quad \text{Eq. (5.6)}$$

The optimal control vector update $\{W\}_{k+1}$ can be solved for algebraically as follows:

$$([C]^*[Q][C]+[R]+[S])\{W\}_{k+1} = ([C]^*[Q][C]+[S])\{W\}_k - [C]^*[Q]\{E\}_k \quad \text{Eq. (5.7)}$$

$$\{W\}_{k+1} = ([C]^*[Q][C]+[R]+[S])^{-1}(([C]^*[Q][C]+[S])\{W\}_k - [C][Q]\{E\}_k) \quad \text{Eq. (5.8)}$$

At steady-state, assuming that control has converged, the optimal control vector is then given by $$\{W\}_{\infty,opt} = -([C]^*[Q][C]+[R])^{-1}[C]^*[Q]\{D\} \quad \text{Eq. (5.9)}$$

and the subsequent steady-state error given by $$\{E\}_{\infty,opt} = ([I_{n\times n}]-[C]([C]^*[Q][C]+[R])^{-1}[C]^*[Q])\{D\} \quad \text{Eq. (5.10)}$$

where $[I_{n\times n}]$ is the n×n identity matrix. Note again that the practical realization of the optimal control law in Eq. (5.8) must use the estimated influence matrix $[\hat{C}]$ instead of the generally unknown or varying actual influence matrix.

Performance and Stability Analysis of Non-Adaptive Optimal Control

The [R] matrix allows penalizing the control effort at each active balance plane, which could be desirable in certain cases. For example, if the source of residual unbalance were not co-located with the active balance planes, the optimal balance correction could be different for different operational speeds. The optimal balance correction at operating speed may sometimes cause harmful vibration at another slower speed if an emergency shutdown resulted in deceleration through a critical speed faster than the active balancing control could track. By conservatively limiting the control effort using a nonzero [R] matrix, higher vibration levels at operating speed could be traded off for a reduced possibility of causing harmful vibration during an emergency shutdown of the rotating machine.

The [S] matrix provides for penalizing the speed of control response. This can have the benefit of potentially allowing enough time for operator intervention in the case of any sort of malfunction of the active balancing system.

Both the [R] and [S] matrices provide opportunities for cautious control that is often required in very conservative industries utilizing turbomachinery in critical continuous processes. Furthermore, both matrices can have the added benefit of enhancing the stability margin of non-adaptive control. By limiting the control inputs or slowing down the control response, an implementation that might originally be unstable due to a bad influence matrix estimate can be made stable. An analysis of the optimal control stability follows.

Replacing the actual influence matrix in the optimal control law of Eq. (5.8) with the estimated influence matrix and substituting in the error vector response relationship of Eq. (2.5), we obtain the recursive relationship $$\{W\}_{k+1} = ([\hat{C}]^*[Q][\hat{C}]+[R]+[S])^{-1}(([\hat{C}]^*[Q][\hat{C}]+[S])\{W\}_k - [\hat{C}]^*[Q][C]\{W\}_k - [\hat{C}]^*[Q]\{D\}) \quad \text{Eq. (5.11)}$$

which leads to $$\{W\}_{k+1} = ([\hat{C}]^*[Q][\hat{C}]+[R]+[S])^{-1}([\hat{C}]^*[Q][\hat{C}]+[S])\{W\}_k - ([\hat{C}]^*[Q][C]+[R]+[S])^{-1}[\hat{C}]^*[Q]\{D\} \quad \text{Eq. (5.12)}$$

For stable control, the control input $\{W\}_{k+1}$ must converge to a constant value. Only the first term multiplied by $\{W\}_k$ is germane to the stability question. The second term multiplying $\{D\}$ is constant and only affects the control vector to which the steady-state control converges. It then follows that the optimal active balancing control is stable for a constant disturbance vector $\{D\}$ and constant influence matrices [C] and $[\hat{C}]$ if and only if $$\bar{\sigma}(([\hat{C}]^*[Q][\hat{C}]+[R]+[S])^{-1}([\hat{C}]^*[Q]([\hat{C}]-[C])+[S])) < 1 \quad \text{Eq. (5.13)}$$

where the symbol $\bar{\sigma}$ signifies the maximum singular value. The effect of the matrix [R] on stability is evident in Eq. (5.13). Regardless of the estimation error $([\hat{C}]-[C])$, a large enough [R] matrix will render the control "stable" by effectively preventing the control effort from increasing unbounded. The effect of the control rate penalty matrix [S] on stability is perhaps not quite so clear from Eq. (5.13). The stability criterion can be expanded again as $$\bar{\sigma}[([\hat{C}]^*[Q][\hat{C}]+[R]+[S])^{-1}([\hat{C}]^*[Q]([\hat{C}]-[\hat{C}]^*[Q][c]+[S])]\text{Eq. (5.14)}$$

Note that since $[\hat{C}]^*[Q][\hat{C}]$ is positive semi-definite, if only the real part of $[\hat{C}]^*[Q][C]$ is positive definite, and if both $[\hat{C}]$ and [C] are full rank (rank m), then there will exist a positive semi-definite real matrix [S] for which the stability criterion of Eq. (5.13) is met. This is analogous to the situation described for the single-plane control of Chapter 3 where the influence coefficient estimate is at least within ±90° of the actual value. The single-plane control, in that case, could be stabilized using a smaller control gain α.

Assuming stable control, and assuming that the disturbance vector $\{D\}$ and actual influence coefficient [C] are constant during convergence, it can be shown that the balance correction vector will converge at steady state to $$\{W\}_{\infty} = -([\hat{C}]^*[Q][C]+[R])^{-1}[\hat{C}]^*[Q]\{D\} \quad \text{Eq. (5.15)}$$

The corresponding steady-state error vector will be $$\{E\}_{\infty} = ([I_{n\times n}]-[C]([\hat{C}]^*[Q][C]+[R])^{-1}[\hat{C}]^*[Q])\{D\} \quad \text{Eq. (5.16)}$$

It is apparent from Eq. (5.15) that even if control is stable, if the influence matrix estimate $[\hat{C}]$ does not equal the actual influence matrix [C], then the steady-state balance correction vector will not necessarily equal the optimal correction vector given in Eq. (5.16) will not equal the error vector of Eq. (5.10) and the control will not be the same as with a perfectly accurate influence matrix estimate. This is one key limitation of the non-adaptive control approach.

If one applies non-zero [R] or [S] penalty matrices purely to enhance stability robustness of the non-adaptive control, certain performance trade-offs become necessary. By inspecting Eq. (5.15), it is evident that as [R] approaches infinity, the steady-state balance correction approaches zero and the steady-state controlled error vector approaches the disturbance $\{D\}$. Thus the stability robustness associated with a large [R] matrix comes at the expense of reduced steady-state control weighted least-squares control performance. If the estimated influence matrix element phase angles fall within 90° of the actual element phase angles such that Re([ĉ]*[Q][C]) is not positive definitely then the [S] matrix can be increased to enhance stability margin. This comes at the expense of slowing down the control convergence rate. The steady-state results in this case also could also could be non-optimal in the same sense as mentioned above.

The stability margin trade-offs and non-optimal performance associated with non-adaptive control using erroneous influence matrix estimates can all be remedied by ensuring an accurate influence matrix estimate through on-line system identification. The next section details the implementation of such a strategy for multiple-plane active balancing systems.

On-Line Estimation of Influence Matrix

To enhance stability robustness and improve performance optimality of the influence matrix-based control, the adaptive control developed in Chapter 3 can be extended for multiple-plane applications. The multiple-plane estimation also utilizes the current and most recent previous sets of measurements to calculate the instantaneous value of the influence matrix. This instantaneous value is then recursively averaged with the previous estimate.

Upon initial startup, or after an unknown step change in the disturbance vector {D} and influence matrix [C], we again assume these vectors do not change during control convergence. Eq. (2.5) for m successive control iterations (where m=the number of balance planes) can then be combined to calculate the influence matrix by the following formula:

$$[C]_{new}=[\Delta E][\Delta W]^{-1} \qquad \text{Eq. (5.17)}$$

where [ΔE] and [ΔW] are matrices containing the changes in correction vectors and error vectors respectively after m successive control iterations such that $$[\Delta W] = \left[\left\{\begin{matrix}w_{1,1}\\\vdots\\w_{m,1}\end{matrix}\right\} - \left\{\begin{matrix}w_{1,0}\\\vdots\\w_{m,0}\end{matrix}\right\} \ldots \left\{\begin{matrix}w_{1,m}\\\vdots\\w_{m,m}\end{matrix}\right\} - \left\{\begin{matrix}w_{1,m-1}\\\vdots\\w_{m,m-1}\end{matrix}\right\}\right] \qquad \text{Eq. (5.18)}$$

$$[\Delta E] = \left[\left\{\begin{matrix}e_{1,1}\\\vdots\\w_{n,1}\end{matrix}\right\} - \left\{\begin{matrix}e_{1,0}\\\vdots\\e_{n,0}\end{matrix}\right\} \ldots \left\{\begin{matrix}e_{1,m}\\\vdots\\e_{n,m}\end{matrix}\right\} - \left\{\begin{matrix}e_{1,m-1}\\\vdots\\e_{n,m-1}\end{matrix}\right\}\right] \qquad \text{Eq. (5.19)}$$

Note that the [ΔW] matrix must be at least (m×m) and non-singular to compute $[C]_{new}$. Thus measured data corresponding to (m+1) independent balance correction states must be obtained to re-calculate the influence coefficient matrix.

Assuming sufficient excitation (i.e., sufficiently independent changes in the control vector $\{W\}_k$ form iteration to iteration), the computed value $[C]_{new}$ will be nonsingular. (A supervisory method will be discussed later that "turns off" estimation and control in certain situations where insufficient excitation persists). As in the single-plane estimation method detailed earlier, the effect of measurement noise can be mitigated using an exponentially weighted recursive average to update the influence matrix estimate. The updated influence matrix used in computing the next control step is estimated as $$[\hat{C}]_k = (1-\beta)[\hat{C}]_{k-1} + \beta[\Delta E]_k[\Delta W]^{-1}_k \qquad \text{Eq. (5.20)}$$

where again the "forgetting factor" is defined as 0≦β≦1 and can be used to govern the extent of control system adaptivity.

Multiple Plane Dithering Method

As discussed previously, to re-compute the influence matrix each iteration, m independent balance correction movements are required to form a non singular "Delta" matrix as shown in Eq. (5.18). However, as the on-line estimation of the influence matrix converges to the actual value, the controller would tend to output nonindependent correction vector commands at each successive control iteration. To alleviate this problem, the control must be "dithered" somehow to provide m independent correction vectors. The simplest way to accomplish this would be to move the correction weights only one balance plane at a time (while recording the error signal vectors after each balance weight movement). This approach, however may cause error signals at some sensor locations to become temporarily worse after moving the balance weights at only one correction plane. The potential for worsening vibration depends on the magnitude of cross-influence present. Cross-influence is when off-diagonal elements of the influence matrix are close to the same magnitude as diagonal elements. The more cross-influence in the system, the more chance for temporarily generating worsened vibration. To ensure that all error sensor output amplitudes decrease, all correction weights could be moved simultaneously (assuming an accurate influence matrix estimate). However, this would not provide independent measurements with which to calculate an updated influence matrix estimate. By creating a matrix of independent basis vectors one could vary the relative independence of each balance sub-iteration and thus have some control over the "singularity" of [ΔW]. Consider the symmetric matrix [T] such that $$[T] = \begin{bmatrix} \left(\frac{1}{m-m\gamma+\gamma}\right) & \left(\frac{1-\gamma}{m-m\gamma+\gamma}\right) & \cdots & \left(\frac{1-\gamma}{m-m\gamma+\gamma}\right) \\ \left(\frac{1-\gamma}{m-m\gamma+\gamma}\right) & \left(\frac{1}{m-m\gamma+\gamma}\right) & & \vdots \\ \vdots & & \ddots & \vdots \\ \left(\frac{1-\gamma}{m-m\gamma+\gamma}\right) & \cdots & \cdots & \left(\frac{1}{m-m\gamma+\gamma}\right) \end{bmatrix} \qquad \text{Eq. (5.21)}$$

where m is the number of balance planes, and γ (0<γ≦1) is an output "dithering" parameter that defines the independence of the balance correction vectors for each control sub-iteration. Note that the sum of all the elements in each row of the basis matrix [T] is unity. Thus at the end of all the sub-iterations the correction weight in a given plane will be fully at the commanded $\{\{W\}_{k+1}$ state. The commanded balance weight vectors for the $p^{th}$ sub-iteration of the control iteration (k+1) would be $$\{W\}_{k+1,p} = \{W\}_{k+1,p-1} + ([I_{m \times m}]\{T\}_p)(\{W\}_{k+1} - \{W\}_k) \qquad \text{Eq. (5.22)}$$

for integer p∈.[0, m], and $\{W\}_{k+1,0}$ initializes as $\{W\}_k$. $[I_{m\times m}]$ indicates the m×m identity matrix and $\{T\}_p$ indicates the $p^{th}$ column of the basis matrix [T]. Note that for γ=1 the matrix [T] is exactly the identity matrix. Subsequently each sub-iteration would involve moving one balance plane correction at a time for maximum correction vector independence and maximum influence matrix estimation signal-to-noise ratio. At the other extreme for γ=0, each sub-iteration would involve moving each balance correction plane simultaneously the same amount. This would minimize the worst temporary error signal amplitude (assuming an accurate influence matrix). This would also, however, result in a singular [ΔW] matrix and render estimation of the influence matrix impossible. In practice, the γ parameter can be specified to provide the desired trade-off between multiple plane influence coefficient estimation signal-to-noise ratio and worst-case error signal amplitude during active balancing.

Recursive Optimal Adaptive Control Law

A recursive adaptive implementation of the optimal control law of Eq. (5.8) can be obtained by the addition of the on-line estimation given in Eq. (5.20) and the "dithering" method governed by the basis matrix of Eq. (5.21). The recursive optimal adaptive control law is then given by the equation $$\{W\}_{k+1} = ([\hat{C}]_k^*[Q][\hat{C}]_k + [R] + [S])^{-1}(([\hat{C}]_k^*[Q][\hat{C}]_k + [S])\{W\}_k - [\hat{C}]_k^*[Q]\{E\}_k) \qquad \text{Eq. (5.23)}$$

where $[\hat{C}]_k$ is the estimated influence matrix computed using Eq. (5.20). Each control iteration k is divided into m sub-iterations over which the correction vector is "dithered" according to Eq. (5.21) to ensure non-singular estimation.

If the correction vector $\{W\}_k$ does not change from iteration to iteration, the influence matrix estimation will also become singular. After estimation "bursting", the estimation and control would be expected to converge again. However, to prevent such "bursting" and the associated high controlled error levels, a supervisory strategy can be implemented to "turn off" estimation when the correction vectors do not change significantly (i.e. $[\Delta W]_k$ becomes singular) and to turn off control when the error vector is controlled below a predetermined level. A flow chart for the supervisory implementation of the optimal adaptive control is shown in FIG. 5.1.

Experimental Results of Optimal Multiple-Plane Control

The optimal adaptive control law was implemented for a two-plane active balancing system on a laboratory flexible rotor test rig. The test rig consisted of a 0.65" (16.5 mm) shaft supported over a span of approximately 30 inches (762 mm) on two ball bearings and driven through a narrow "quill-shaft" coupled to a direct current type motor. Active balancing devices were mounted to the shaft at approximately the third-span locations. Each balance actuator and disk assembly weighed approximately 10 lbs. (4.5 kg). Eddy current proximity probes mounted close to, and outboard of the two disk locations were used to measure radial shaft deflection in two orthogonal (i.e., x and y) directions.

The first two critical speeds of the rotating test rig were measured to be approximately 1100 rpm and 4360 rpm. The predicted mode shapes for these two critical speeds are shown in FIG. 5.3.

To test the active balancing system for a plant with fairly "rich" rotordynamics the rotor was run at about 3,100 rpm during the experiments. Since this speed was in between the first two critical speeds, both mode shapes contributed significantly to dynamic response. FIG. 5.4 shows the predicted forced-response deflected shape of the rotor due to a 0.34 oz-in unbalance at the drive-end (left end) active balancing plane. This unbalance represented the maximum correction capacity of the active balancing device. FIG. 5.4 could be used to predict the influence coefficient at 3,100 rpm from the drive-end active balancing device to the two sensors. The combination of contributions of the two mode shapes at 3,100 rpm provides for a relatively interesting response situation. Note that unbalance at the drive end balance has a much greater influence on shaft response at the outboard sensor than on the drive-end sensor. Since the rotor configuration is highly symmetrical, the outboard balance plane also has the greatest influence on the drive-end sensor. The actual experimental results matched this prediction fairly well in a qualitative sense. The average measured influence matrix between both balance planes and four sensors at 3,100 rpm is presented in Table 5.1.

Single-Plane Versus Multiple-Plane Active Balancing Results

Because two modes contribute significantly to response at 3,100 rpm, one active balance plane would not in general be sufficient to balance the rotor. FIG. 5.5 shows the results of active balancing using one balance plane (drive-end) compared with results using two balance planes. The adaptive control law was used in both cases and all optimal penalty weighting matrices had the same values [Q]=[I], and [R]=[S]=[0].

Note that the initial vibrations for the one and two-plane tests were not the same because the initial active balance correction in the single-plane balancing experiment was not zero (residual unbalance for both tests was the same). It is evident from FIG. 5.5 that the single-plane optimal control does not match the performance of the dual-plane control. In fact, the single-plane control is only able to improve a small amount over the initial vibration error. This is an indication that: 1) residual unbalance was exciting more than one mode; and 2) the disturbance vector lays mostly outside the span of the single-plane "controllability" space. The latter means that the residual unbalance was not concentrated at the active balance plane and did not excite the two modes in the same way as the active balance correction.

Weighted Output Optimal Adaptive Control

As noted above, there may be occasions where balance correction should be restricted to allow for safe traversing of different vibration modes in the event of an emergency shut-down of the machinery. In this case the control effort penalty matrix [R] could be increased to penalize correction magnitude. FIG. 5.6 compares adaptive control results for both and non-zero[R] matrices.

Note that the penalized steady-state control effort (balance correction magnitude) is reduced to about one half of the non-penalized control effort. This optimal trade-off obviously also results in higher steady-state vibration error magnitudes.

Partially Output Dithered Adaptive Optimal Control

The control output dithering required to ensure non-singular estimation could potentially cause temporarily high vibration error values even when a good influence estimate is available. This effect will be worst when there is a high level of "cross-coupling" between balance planes. That is, the off-diagonal terms of the influence matrix are significant relative to the diagonal terms. FIG. 5.7 compares the results of adaptive control shown in FIG. 5.6 using full output dithering (y=1) versus the performance using reduced output dithering (y=0.25). Although the influence matrix in this case was not necessarily "highly coupled", one can still observe a difference in the first control iteration.

Results of Fully Output Dithered Adaptive Optimal Control of Lightly Cross-Coupled System Note that the vibration in the first iteration of fully dithered output actually increased over the initial vibration. By updating only one active balancing plane at a time, balance correction does not move in a "straight line" toward the optimal state' The excursions of the correction state about the optimal state can potentially cause such worsening vibration before the other balance plane is updated. Using only partial output dithering allows both planes to be partially updated in the same control iteration, thereby reducing the "excursions" of the balance correction state from the optimal state. The lower dithering parameter number causes the balance correction vectors to proceed more "smoothly" toward the optimal states. This is illustrated by the continuously decreasing objective function value for the partial output dithered control in the figure above.

Comparison of Non-Adaptive and Adaptive Optimal Control with Somewhat Inaccurate Influence Matrix Estimate A significant test of the optimal control methods was to provide an erroneous influence matrix estimate to the controller. FIG. 5.8 shows a comparison of optimal control results four control scenarios when the initial influence matrix estimate is erroneous. The influence matrix estimate for the test was approximately 0.6 times the magnitude and rotated 70° from the actual matrix shown in Table 5.1. The first plot of FIG. 5.8(*a*) shows the unstable performance resulting from traditional non-adaptive control under this condition. FIG. 5.8(*b*) shows how the non-adaptive control was stabilized using a non-zero [R] matrix. Thirdly, FIG. 5.8(*c*) illustrates non-adaptive control stabilization using a non-zero [S] matrix. FIG. 5.8(*d*) shows the results of adaptive control.

In each case the error sensors all received equal weighting and the [R] and [S] matrices were either zero matrices if not noted or were diagonal with the value shown. Because of the inaccurate influence matrix estimate, the conventional non-adaptive weighted least-squares control is unstable as shown in FIG. 5.8(*a*). The active balancing devices were both saturated (outputting maximum correction possible), providing the only limit to the vibration increasing further. Such vibration values represent damaging and potentially dangerous levels.

Dual-Plane Optimal Active Balancing Control Results for Somewhat Inaccurate Initial Influence Matrix Estimate Adding a non-zero penalty on control effort to the objective performance function has the positive effect of producing stable control as seen in FIG. 5.8(*b*). The only downside is that the steady-state vibration levels are not especially low. The use of a non-zero control rate of change penalty term in the objective performance function also results in stable control as illustrated in FIG. 5.8(*c*). It is evident, however, that the control convergence rate is not ideal. FIG. 5.8(*d*) shows that adaptive control not only provides stable control, but converges relatively quickly. This is in spite of the fact that the output must be dithered to ensure non-singular estimation. The "overshoot" of the vibration levels for the adaptive control case was caused by the erroneous influence matrix initial estimate. After one control iteration, however, the influence matrix estimate was corrected and the vibration subsequently was reduced rapidly to low levels.

The corresponding objective function values for the results of FIG. 5.8 are given in FIG. 5.9. Also shown in FIG. 5.9 are estimates of the stability criterion of Eq. (5.13) for each optimal control scenario. This criterion could not, in general be measured directly as the actual influence matrix is unknown. For FIG. 5.9, the average influence matrix measured during experimentation (shown in Table 5.1) was used as the "actual" influence matrix [C] in Eq. (5.13).

For stable control, the stability criterion must be below the value one. Note that the unstable traditional non-adaptive control has a stability criterion value of close to two. By adding nonzero penalty matrices [R] and [S], the stability criterion value drops below one and the control converges. The stability criterion for the adaptive control begins at the same unstable value as the traditional non-adaptive control. This corresponds to the temporarily worse vibration in the first control iteration. However, as the on-line estimation converges to the actual influence matrix, the adaptive stability criterion value falls below one and eventually falls close to zero. The result is that the control converges rapidly.

The non-adaptive control is rendered stable using the non-zero [S] matrix. Furthermore, the performance in terms of weighted least-squares error is better than the case of using a non-zero [R] matrix. However, it is important to note that the steady-state performance using the non-zero [S] matrix was still sub-optimal because of the inaccurate influence matrix estimate. The minimum steady-state objective function value attained with the non-adaptive control was 0.16. Though much lower than the uncontrolled value, this was almost 2.5 times greater than the minimum objective function value of 0.0665 attained using the adaptive control. Thus it is clear that adaptive control not only provides fast and stable control convergence, but also provides more optimal steady-state performance as predicted by observing Eq. (5.15) and Eq. (5.16).

Comparative Optimal Control Results for Highly Inaccurate Influence Matrix Estimate When the influence coefficient estimate has any elements more than 90° rotated from the corresponding element actual influence matrix, a non-zero [S] matrix cannot stabilize the non-adaptive control. By choosing an appropriate non-zero [R] matrix, the unstable outputs of the non-adaptive control can be effectively bounded. Such control will not have optimal results, however. In fact, the vibration cannot be reduced but will only be prevented form increasing out of control. FIG. 5.10 shows the results of using an influence matrix estimate whose elements are all rotated approximately 135° from the actual matrix elements.

The non adaptive control experiments in FIG. 5.10(*a*) was concluded with only a few control iterations because the balance corrections were diverging and had saturated at full balance correction capacity (correcting in the "wrong" direction). By increasing the control effort penalty, although the vibration becomes worse after control, the steady-state balance correction capacity does not saturate at full capacity. Hence the steady-state vibration seen in FIG. 5.10(*b*) is not as bad as the traditional non-adaptive case. The test shown in FIG. 5.10(*b*) was concluded after the active balance corrections had achieved steady state and were no longer changing. The control results shown in FIG. 5.10(*c*) again illustrate the effectiveness of the adaptive control strategy even when the influence matrix is initially estimated poorly enough to cause unstable non-adaptive control. After initially increasing the vibration, the adaptively controlled vibration quickly converges to very low levels.

It is to be understood that the inventions are not limited to the exact construction or methods illustrated and described above. Rather, various changes may be made without departing from the spirit and scope of the inventions as defined and as are set forth in the following claims.

I claim:

1. A rotating machinery assembly, said assembly comprising: at least one movable rotor member which is deployed upon said rotating machinery assembly, said at least one movable rotor member having a weight distribution, wherein said at least one movable rotor member is selectively movable to produce a corrective phasor with a correction magnitude and a correction phase angle; a vibration sensor which senses a vibration and generates a vibration signal; and a controller for controlling said at least one movable member wherein said controller includes a microprocessor operating with stored control programs, said controller receives said vibration signal from said vibration sensor and said control programs calculate a phasor value to selectively move said at least one movable rotor member to produce a corrective phasor to reduce said sensor vibration.

2. The assembly of claim 1, wherein said assembly includes at least one position sensor for providing positioning information on said at least one movable rotor member.

3. The assembly of claim 1, wherein said controller including a supervisory control strategy for deactivating controller movement of said movable member.

4. The assembly of claim 1, wherein said controller computes a synchronous vibration error phasor.

5. The assembly of claim 1, wherein said controller calculates an angular location of said at least one movable rotor.

* * * * *